United States Patent [19]

Nakahira et al.

[11] Patent Number: 5,621,862
[45] Date of Patent: Apr. 15, 1997

[54] INFORMATION PROCESSING APPARATUS FOR IMPLEMENTING NEURAL NETWORK

[75] Inventors: Hiroyuki Nakahira; Masakatsu Maruyama; Shiro Sakiyama; Susumu Maruno, all of Osaka; Toshiyuki Kouda, Nara; Masaru Fukuda, Osaka, all of Japan

[73] Assignee: Matsushita Electric Industrial Co., Ltd., Osaka, Japan

[21] Appl. No.: 281,683

[22] Filed: Jul. 28, 1994

[30] Foreign Application Priority Data

| Jul. 29, 1993 | [JP] | Japan | 5-188121 |
| Sep. 13, 1993 | [JP] | Japan | 5-226956 |
| Jul. 11, 1994 | [JP] | Japan | 6-158454 |

[51] Int. Cl.$^6$ ................................. G06F 15/18
[52] U.S. Cl. .................................. 395/27; 395/23
[58] Field of Search ...................... 395/24, 27, 600, 395/23, 11; 382/157, 159, 253; 358/518, 296

[56] References Cited

U.S. PATENT DOCUMENTS

| 4,994,982 | 2/1991 | Duranton et al. | 395/27 |
| 5,005,206 | 4/1991 | Naillon et al. | 382/253 |
| 5,040,230 | 8/1991 | Takatori et al. | 382/159 |
| 5,052,043 | 9/1991 | Gaborski | 382/157 |
| 5,109,275 | 4/1992 | Naka et al. | 395/22 |
| 5,129,042 | 7/1992 | Jeong | 395/27 |
| 5,148,045 | 9/1992 | Oyanagi | 395/24 |
| 5,164,837 | 11/1992 | Hirosawa | 358/296 |
| 5,165,010 | 11/1992 | Masuda et al. | 395/27 |
| 5,167,006 | 11/1992 | Furuta et al. | 395/11 |
| 5,195,171 | 3/1993 | Takatori et al. | 395/24 |
| 5,216,746 | 6/1993 | Yoshizawa et al. | 395/24 |
| 5,226,092 | 7/1993 | Chen | 382/14 |
| 5,253,327 | 10/1993 | Yoshihara | 395/22 |
| 5,255,347 | 10/1993 | Matsuba et al. | 395/23 |
| 5,274,746 | 12/1993 | Mashiko | 395/27 |
| 5,276,771 | 1/1994 | Manukian et al. | 395/24 |
| 5,293,459 | 3/1994 | Duranton et al. | 395/27 |
| 5,297,237 | 3/1994 | Masuoka et al. | 395/23 |
| 5,299,286 | 3/1994 | Imondi et al. | 395/27 |
| 5,386,149 | 1/1995 | Arima | 395/24 |
| 5,390,284 | 2/1995 | Ogata et al. | 395/23 |
| 5,410,689 | 4/1995 | Togo et al. | 395/600 |
| 5,434,951 | 7/1995 | Kuwata | 395/24 |
| 5,446,829 | 8/1995 | Wang et al. | 395/24 |
| 5,469,530 | 11/1995 | Makram-Ebeid | 395/23 |
| 5,475,795 | 12/1995 | Taylor | 395/27 |

FOREIGN PATENT DOCUMENTS

2-236658  9/1990  Japan .

OTHER PUBLICATIONS

James et al., Journal of Parallel and Distributed Computing, vol. 14, No. 3, pp. 221–235 (1992).

Hirose et al., Neural Networks, vol. 4, No. 1, pp. 61–66 (1991).

Huang et al., IEICE Trans. Inf. & Syst., vol. E75-D, No. 1, pp. 170–179 (1992).

*Primary Examiner*—Robert W. Downs
*Assistant Examiner*—Sanjiv Shah
*Attorney, Agent, or Firm*—McDermott, Will & Emery

[57] ABSTRACT

In an information processing apparatus for implementing a neural network, if an input vector is inputted to a calculating unit, a neuron which responds to the input vector is retrieved in accordance with network interconnection information stored in a first storage unit and the neuron number indicating the retrieved neuron is written in a first register. The calculating unit reads out the internal information of the neuron stored in a second storage unit by using the neuron number, writes it in a second register, and calculates the sum of products of the outputs of the neurons and the connection loads of synapses connected to the neurons. By repeating the sequence of operations by the number of times corresponding to the total number of input vectors, a recognition process is executed. The neural network can easily be expanded by rewriting the contents of the first and second storage units.

18 Claims, 30 Drawing Sheets

FIG.8

| A[15:0] | B[15:0] |
|---------|---------|
| 0×0000  | 0×FFFF  |
| 0×0001  | 0×FFFE  |
| ⋮       | ⋮       |
| 0×0100  | 0×FEFF  |
| ⋮       | ⋮       |
| 0×FFFF  | 0×0000  |

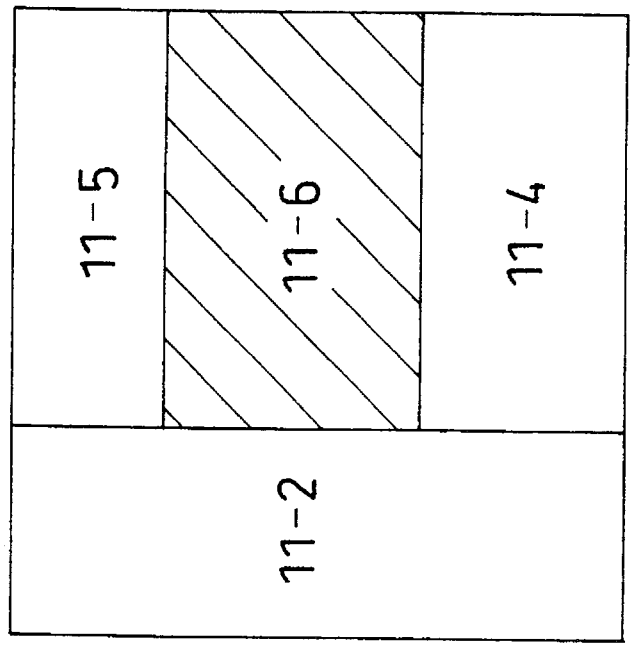
FIG.17(b)
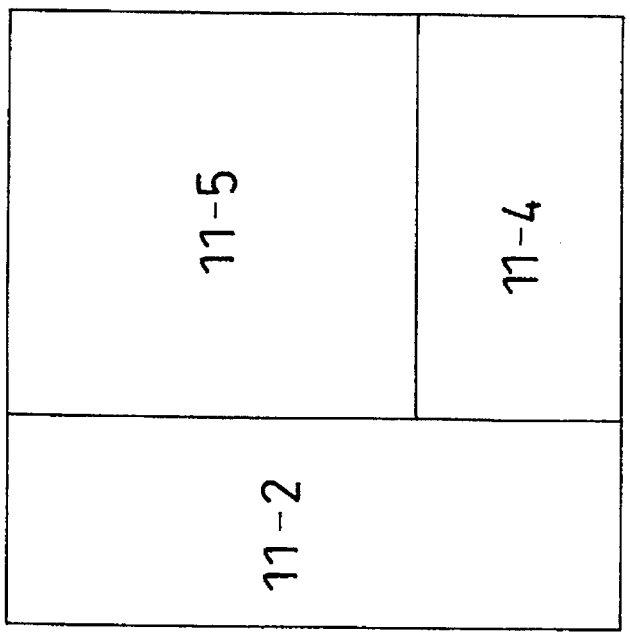
FIG.17 (a)

FIG.26

| number / type | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 0 | 1 | 2 | 3 | 4 | 5 | 6 | 7 | 8 | 9 |
| 2 | 0 | 1 | 2 | 3 | 4 | 5 | 6 | 7 | 8 | 9 |

INFORMATION PROCESSING APPARATUS FOR IMPLEMENTING NEURAL NETWORK

BACKGROUND OF THE INVENTION

The present invention relates to an information processing apparatus for performing a speech recognition process and an image recognition process.

In recent years, increasing attention has been focused on information processing to which a neural network is applied in the field of information processing. The neural network was achieved in imitation of the structure of neurons provided in the brain of a living organization. Although a large number of processes in the neural network are implemented by conventional sequential calculators of von Neumann type, their processing speeds are extremely low. To solve the problem, attempts have been made lately to implement the neural network by means of dedicated electronic circuits.

Among methods of implementing the neural network with dedicated electronic circuits, there has been known such a method as disclosed in Japanese Laid-Open Patent Publication No. 2-236658, in which hardware is used in common by a time-division method so that the amount of hardware is not exponentially increased even if the number of neurons is increased in order to perform more complicated information processing in the neural network.

In the above conventional method of implementing the neural network, however, the structure of the network system that can be implemented by a single information processing apparatus is fixed, so that it is inappropriate for a single information processing apparatus to implement any information processing from the simplest to the most complicated, i.e., any network from the smallest to the largest. This is because, to implement any neural network from the smallest to the largest, it is necessary to conform the information processing apparatus to the specification of a large-scale neural network. In the case of implementing a small-scale neural network, redundant parts are increased accordingly.

Moreover, as the number of data sets to be inputted and the number of candidates to be selected increase, the number of cycles required for selection is increased, so that the total processing time becomes longer.

If an address is allocated to each neuron as in the conventional method, on the other hand, the network scale is limited by the bit width of the address. In the case where the addresses of neurons are outputted to their common bus, it is impossible to output a plurality of addresses at the same time, so that longer processing time is required in accordance with the number of learning neurons.

In the case where a plurality of information processing apparatus are juxtaposed to expand the network, any one of the information processing apparatus is selected so that data is inputted to or outputted from the selected apparatus. Hence, it is impossible to input a set of data simultaneously to all the information processing apparatus, nor is it possible to obtain data from all the information apparatus at the same time, so that problems such as the deterioration of processing efficiency arise.

As for learning efficiency, if input data the font of which has similar configuration, such as printed characters, is to be learned, a specific input signal becomes large. In learning the Hebb learning rule, e.g., only the weight coefficient of a specific synapse becomes large so as to dominate the firing of the corresponding output neuron. The synapse with a large weight coefficient exerts a large influence in recognizing unlearned input data with a large signal, resulting in wrong recognition. As a result, even if the number of learnings is increased, the recognition rate with respect to unlearned data is not improved.

SUMMARY OF THE INVENTION

The present invention has been achieved in view of the foregoing. A first object of the present invention is to provide an information processing apparatus which can implement a neural network the structure of which gradually changes with the proliferation of a neuron, unlike a conventional network the structure of which is fixed.

A second object of the present invention is to provide an information processing apparatus in which the time required for selecting candidates is determined by the number of data sets inputted, irrespective of the number of candidates for a recognition result.

A third object of the present invention is to provide an information processing apparatus which provides an equal processing speed at which learning is performed by a neuron even when it is used singly or in combination with other identical information processing apparatus so as to expand the network.

A fourth object of the present invention is to provide an information processing apparatus which can not only implement a larger-scale neural network but also has an ability to provide higher speed processing than that obtained in the prior art.

A fifth object of the present invention is to provide an information processing apparatus whereby the recognition rate with respect to unlearned data can be increased in the case of handling very similar data with little variance, such as printed characters.

To attain the above first object, a first information processing apparatus for implementing a multi-layer neural network having a plurality of neurons, each of which recognizes or learns an input signal through a calculation in the network, comprises: a first storage means for storing network interconnection information which indicates the interconnection of said plurality of neurons in said neural network so that the network interconnection information can be rewritten; a second storage means for storing neuron internal information which is specific information on individual neurons in said neural network so that the neuron internal information can be rewritten; a third storage means for storing a neuron read out of said first storage means; a fourth storage means for storing the neuron internal information read out of said second storage means; and a calculating means for retrieving the neuron which responds to said input signal by using the network interconnection information stored in said first storage means, reading out of said first storage means the retrieved neuron so that it is written in said third storage means, reading out of said second storage means the neuron internal information corresponding to the neuron stored in said third storage means so that it is written in said fourth storage means, and performing said calculation in the network by using the neuron internal information stored in said fourth storage means.

With the above structure, it becomes possible to store the interconnection of the network in the first and second storage means. Accordingly, the interconnection of the network can be changed by simply rewriting the contents of the first and second storage means. As a result, it becomes possible to constitute a neural network of any size from the smallest to the largest by means of a single or a plurality of identical information processing apparatus. Preferably, in the above first information processing apparatus, the above calculating means further has a function of rewriting the neuron internal information stored in said second storage means and rewriting the network interconnection information stored in said first storage means by using the neuron internal information which has been rewritten. Accordingly, the contents of the first and second storage means can be rewritten by the calculating means. As a result, the interconnection of the neural network can be changed through learning inside the neural network.

A second information processing apparatus for implementing a multi-layer neural network having a plurality of neurons, each of which has state energy and proliferates if said state energy exceeds a specified threshold value, so as to perform learning by changing the state energy of any of said plurality of neurons and the connection load of a synapse connected to the neuron comprises: a number assigning means for assigning a specific neuron number to each of said plurality of neurons; a first storage means for storing network interconnection information which indicates the interconnection of said plurality of neurons, each having said neuron number, by showing the process in which said plurality of neurons were generated by proliferation so that the network interconnection information can be rewritten; a second storage means for storing the state energy of each of said plurality of neurons and the connection load of a synapse connected to each of said plurality of neurons so that each of the state energy and connection load can be rewritten; a first calculating means for retrieving a fired neuron by using the network interconnection information stored in said first storage means and reading the neuron number assigned to the retrieved neuron out of said first storage means; a second calculating means for reading, by using the neuron number read out by said first calculating means, the state energy of the neuron corresponding to said neuron number and the connection load of a synapse connected to said neuron out of said second storage means; and a third calculating means for calculating, by using the connection load of a synapse read out by said second calculating means, the sum of products of the outputs of said plurality of neurons and the connection loads of synapses connected to said plurality of neurons.

With the above structure in which the first and second calculating means are provided exclusively for the first and second storage means, respectively, it becomes possible to individually access to each of the storage means, resulting in a higher processing speed. It becomes also possible to control the process in which neurons proliferates, the structure of the network, and the internal information of neurons only with the numbers assigned to individual neurons.

Preferably, in the above second information processing apparatus, the above number assigning means assigns ascending neuron numbers to said plurality of neurons in the order in which the neurons were generated by proliferation. Thus, by writing the internal information of individual neurons in the second storage means in the order in which the neurons were generated, the second storage means can be used efficiently without suffering from fragmentation, so that a reduction in the storage capacity can be expected.

Preferably, in the above second information processing apparatus, the above second calculating means further has a function of rewriting the state energy and the connection load of a synapse stored in said second storage means and said first calculating means further has a function of rewriting, by using the state energy which has been rewritten by said second calculating means, the network interconnection information stored in said first storage means.

With the above structure, the contents of the first and second storage means can be rewritten by the first and second calculating means, respectively. As a result, the interconnection of the neural network can be changed through learning inside the neural network.

A third information processing apparatus for implementing a multi-layer neural network having a plurality of neurons, each of which has state energy and proliferates if said state energy exceeds a specified threshold value, so as to perform learning by changing the state energy of any of said plurality of neurons and the connection load of a synapse connected to the neuron comprises: a number assigning means for assigning a specific neuron number to each of said plurality of neurons; a storage means for storing network interconnection information which indicates the interconnection of said plurality of neurons, each having said neuron number, by showing the process in which said plurality of neurons were generated by proliferation, the state energy of each of said plurality of neurons, and the connection load of a synapse connected to each of said plurality of neurons so that each of the network interconnection information, state energy, and connection load of a synapse can be rewritten; a first calculating means for retrieving a fired neuron by using the network interconnection information stored in said storage means and reading the neuron number assigned to the retrieved neuron out of said storage means; a second calculating means for reading, by using the neuron number read out by said first calculating means, the state energy of the neuron corresponding to said neuron number and the connection load of a synapse connected to said neuron out of said storage means; a third calculating means for calculating, by using the connection load of a synapse read out by said second calculating means, the sum of products of the outputs of said plurality of neurons and the connection loads of synapses connected to said plurality of neurons; an address converting means for inverting the logic of each bit at a first address outputted from said first calculating means so as to provide a second address and outputting the resulting second address; a selecting means for selecting either of the second address outputted from said address converting means and a third address outputted from said second calculating means and, if said second address was selected, enabling said first calculating means to access the second address in said storage means while, if said third address was selected, enabling said second calculating means to access the third address in said storage means; and a select signal output means for outputting a select signal for determining the selection by said selecting means.

With the above structure using the address converting means, it becomes possible, e.g., for the first calculating means to write the network interconnection information in the storage means from its highest order address downward and for the second calculating means to write the internal information of individual neurons in the storage means from its lowest order address upward. Consequently, two types of information can be stored in a single storage means, so that the number of storage means can be reduced.

Preferably, in the above third information processing apparatus, the above second calculating means further has a function of rewriting the state energy and the connection load of a synapse stored in said storage means and said first calculating means further has a function of rewriting, by using the state energy which has been rewritten by said second calculating means, the network interconnection information stored in said storage means. Accordingly, the contents of the first and second storage means can be rewritten by the first and second calculating means, respectively. As a result, the interconnection of the neural network can be changed through learning inside the neural network.

To obtain the above second object, a fourth information processing apparatus for implementing a neural network which selects, as candidates for a recognition result, n categories out of N categories which are obtained by subjecting an input signal to a calculation in the network so as to be recognized comprises: first to (n−1)-th candidate selecting means, each having a comparing means for comparing the values of two sets of data, a first storage means for storing, of said two sets of data, that set of data having the larger value, a second storage means for storing, of said two sets of data, that set of data having the smaller value, a third storage means for storing information for distinguishing the data stored in said first storage unit from other accompanying data, and a fourth storage means for storing information for distinguishing the data stored in said second storage means from other accompanying data; an n-th candidate selecting means having said comparing means and said first and third storage means, the first to n-th candidate selecting means being connected in cascade so that either of the two sets of data compared by the comparing means of said candidate selecting means is stored in the first storage means of the first candidate selecting means, while the other set of data becomes any of the N sets of data, and that either of the two sets of data compared by the comparing means of an i-th ($2 \leq i \leq n$) candidate selecting means is stored in the first storage means of the i-th candidate selecting means, while the other set of data is stored in the second storage means of an (i−1)-th candidate selecting means.

With the above structure, n candidates can be selected by the first to n-th candidate selecting means, respectively, by simply giving N sets of data only once. For example, if N=100 and n=10, ten candidates in total can be selected in about 100 cycles. Accordingly, the processing speed can be increased considerably. Since a desired number of candidate selecting means having the same function are simply connected in cascade, the number of candidates for a recognition result can be changed easily.

To attain the above third object, a fifth information processing apparatus for implementing a neural network having a plurality of neurons each of which performs learning upon receiving a teacher signal having first and second values comprises: a specifying means for specifying, among said plurality of neurons, a neuron which performs learning by using the first value of said teacher signal; and a determining means for determining whether or not the specification of the neuron by said specifying means is valid, wherein, only if it is determined that the specification of the neuron by said specifying means is valid, learning is performed by the neuron specified by said specifying means by using the first value of said teacher signal and learning is performed by said plurality of neurons except for the neuron specified by said specifying means by using the second value of said teacher signal.

With the above structure, even in the case where a neural network is implemented by the plurality of information processing apparatus, learning can be performed individually in each information processing apparatus without changing the speed at which each performs learning. Consequently, even if a larger-scale neural network is implemented by the information processing apparatus, the speed at which learning is performed is not lowered. Moreover, since the scale of the neural network is not limited to one that can be implemented by a single information processing apparatus, it can easily be expanded.

To attain the above fourth object, a sixth information processing apparatus for implementing a multi-layer network which performs a recognition process with respect to given characteristic data through a calculation in the network and outputs the processing result comprises:

With the above structure, a plurality of information processing apparatus are juxtaposed for use so that the first and second signals of different types control the inputting and outputting of data. Consequently, not only the neural network can easily be expanded but also the loading of input data on individual information processing apparatus can be performed simultaneously, thereby providing increased processing efficiency.

A seventh information processing apparatus for implementing a multi-layer neural network comprises: a first signal for executing the inputting of said characteristic data from the outside or the outputting of said processing result to the outside; and a second signal, different from said first signal, for executing the inputting of said characteristic data from the outside or the outputting of said processing result to the outside.

With the above structure using the first signal shared by all the information processing units and the second signal inherent to each information processing unit, the neural network can easily be expanded.

An eighth information processing apparatus for implementing a multi-layer neural network comprises: a plurality of information processing units each of which performs a recognition process with respect to given characteristic data through a calculation in the network and outputs the processing result; and an adding means for adding up the processing results outputted from said plurality of information processing units, each of said information processing units having: a first signal for executing the inputting of the characteristic data from the outside of said information processing unit or the outputting of the processing result to said adding means, said first signal being shared by all the information processing units; and a second signal for executing the inputting of the characteristic data from the outside of said information processing unit or the outputting of the processing result to said adding means, said second signal being inherent to said information processing unit.

With the above structure, the adding means adds up the outputs of all the information processing units. Consequently, the number of inputs of the network can easily be increased.

A ninth information processing apparatus for implementing a multi-layer neural network comprises: a plurality of information processing units each of which performs a recognition process with respect to given characteristic data through a calculation in the network and outputs the processing result; and a comparing means for comparing the processing results outputted from said plurality of information processing units, each of said information processing units having: a first signal for executing the inputting of the characteristic data from the outside of said information processing unit or the outputting of the processing result to said comparing means, said first signal being shared by all the information processing units; and a second signal for executing the inputting of the characteristic data from the outside of said information processing unit or the outputting of the processing result to said comparing means, said second signal being inherent to said information processing unit.

With the above structure, the comparing means compares the outputs of all the information processing apparatus.

Consequently, the number of outputs of the network can easily be increased.

To attain the above fifth object, a tenth information processing apparatus for implementing a neural network consisting of neurons, each having a synapse, comprises: a storage means for storing the weight coefficient of said synapse; a calculating means for performing a calculation by using the weight coefficient of said synapse read out of said storage means and an input signal to said synapse and outputting the calculation result; and a non-linear processing means for performing non-linear processing with respect to said calculation result from said calculating means and writing, in said storage means, the non-linear processing result as a new weight coefficient of said synapse.

With the above structure, the weight coefficient of a synapse is read out of the storage means at the time of learning, so that the calculating means calculates using the above weight coefficient and the input signal to the above synapse and that the calculation result is supplied to the non-linear processing means. The non-linear processing means then performs non-linear processing with respect to the above calculation result, so that the non-linear processing is written in the storage means as a new weight coefficient of the above synapse. Thus, by performing the non-linear processing with respect to the weight coefficient after the calculation, it becomes possible, e.g., to prevent the weight coefficient, which is updated in learning in accordance with the Hebb learning rule or the like, from becoming excessively large. Consequently, even in the case of handling very similar data with little variance such as printed characters, it becomes possible in learning to prevent the weight coefficient of a specific synapse from taking a prominent value, so that the possibility of recognizing unlearned data by mistake in recognition can be reduced.

An eleventh information processing apparatus for implementing a neural network consisting of neurons, each having a synapse, comprises: a storage means for storing the weight coefficient of said synapse; a non-linear processing means for performing non-linear processing with respect to the weight coefficient of said synapse read out of said storage means and outputting the non-linear processing result; and a calculating means for performing a calculation by using said non-linear processing result from said non-linear processing means and an input signal to said synapse so as to write, in said storage means, the calculation result as a new coefficient of said synapse.

With the above structure, the non-linear processing is performed with respect to the weight coefficient of a synapse prior to the calculation. Consequently, it becomes possible to prevent the weight coefficient of the synapse, which has been updated, from becoming excessively large.

A twelfth information processing apparatus for implementing a neural network, each having a synapse, comprises: a storage means for storing the weight coefficient of said synapse; a non-linear processing means for performing non-linear processing with respect to the weight coefficient of said synapse read out of said storage means; and a calculating means for executing the processing of said neuron by using the nonlinear processing result from said non-linear processing means and an input signal to said synapse so as to output the processing result.

With the above structure, the non-linear processing is performed at the time of recognition with respect to the weight coefficient of a synapse to be used in the processing of a neuron. Consequently, it becomes possible to suppress the influence of the weight coefficient of a synapse having a large value.

A thirteenth information processing apparatus for implementing a neural network consisting of neurons, each having a synapse, comprises: a storage means for storing the weight coefficient of said synapse; a calculating means for performing a calculation by using the weight coefficient of said synapse read out of said storage means and an input to said synapse so as to write the calculation result in said storage means; and a non-linear processing means for performing non-linear processing with respect to said calculation result read out of said storage means so as to write, in said storage means, the non-linear processing result as a new weight coefficient of said synapse.

With the above structure, the non-linear processing is performed at the time of learning with respect to the weight coefficient of a synapse which has been updated. Consequently, it becomes possible to reduce the weight coefficient of the synapse, which has been updated and has become excessively large.

A fourteenth information processing apparatus for implementing a neural network, each having a synapse, comprises: a storage means for storing the weight coefficient of said synapse; a calculating means for performing a calculation by using the weight coefficient of said synapse read out of said storage means and an input to said synapse so as to output the calculation result; a non-linear processing means for performing non-linear processing with respect to said calculation result from said storage means and outputting the non-linear processing result; and a selecting means for selecting either of said calculation result from said calculating means and said non-linear processing result from said non-linear processing means so that the selected result is written in said storage means as a new weight coefficient of said synapse.

With the above structure, it becomes possible not to perform the non-linear processing in the case of handling data with much variance such as hand-written characters.

BRIEF DESCRIPTION OF THE DRAWINGS

FIG. 8 is a view showing an operation of converting an address by the above address converting circuit;

FIGS. 17(a) and 17(b) are views showing the proliferation of a neuron in two dimensions;

FIG. 26 is a view showing character data;

Figure 1:
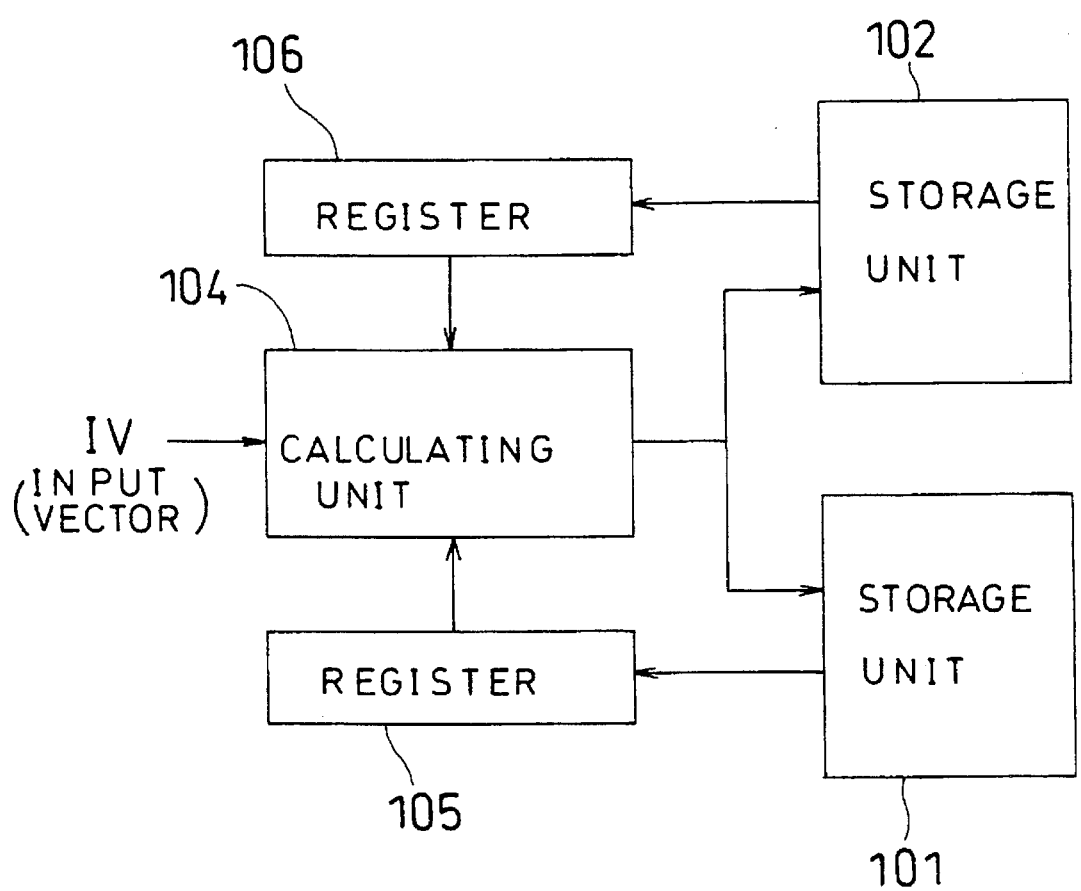
FIG. 1 is a block diagram showing an information processing apparatus according to a first embodiment of the present invention.

DETAILED DESCRIPTION OF THE PREFERRED EMBODIMENTS (First Embodiment)

Referring now to the drawings, an information processing apparatus according to a first embodiment of the present invention will be described below.

A description will be given first to a neural network implemented by the information processing apparatus according to the present embodiment. The neural network is capable of dynamically proliferating a neuron in accordance with the information processing in question and of reproducing itself.

Among neural networks of this type, such networks as disclosed in "Character Recognition with Adaptive Segmentation of Quantizer Neuron Architecture (ASQA)": IEICE Digest of Technical Papers NC91-51 pp. 23–28 or in "Adaptive Segmentation of Quantizer Neuron Architecture (ASQA)": IJCNN'93, Proceedings Vol. 1, pp. 367–370 are well known.

Figure 15:
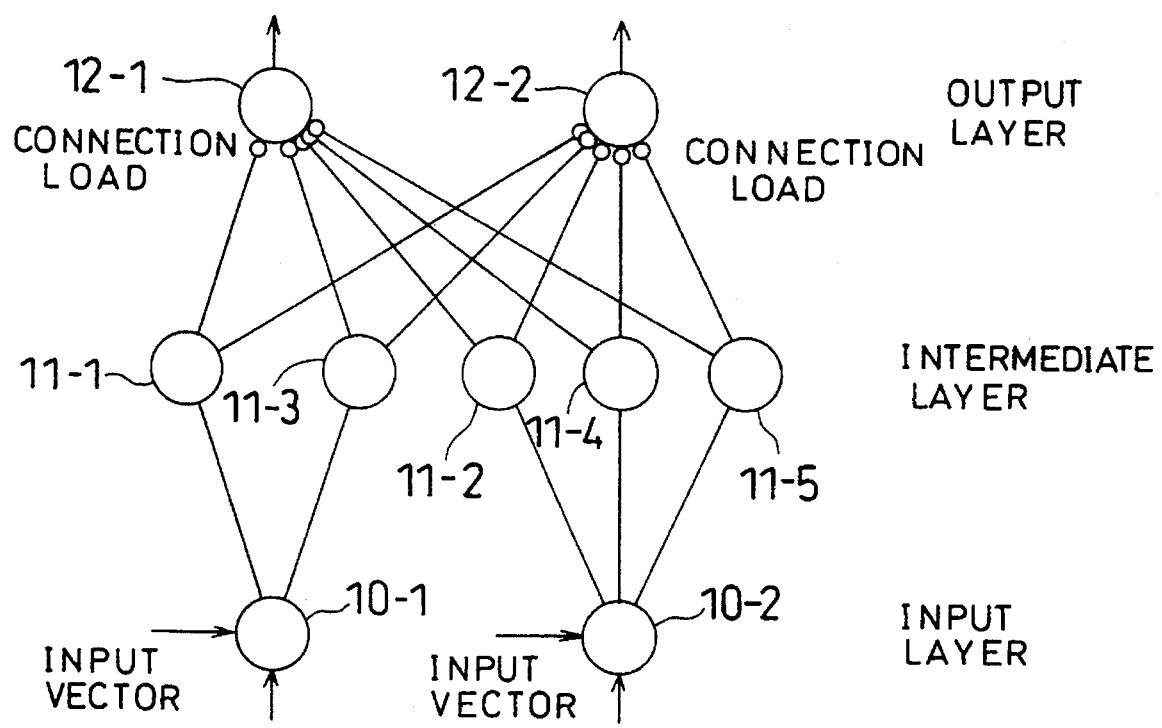
FIG. 15 is a view showing an example of the neural network which reproduces itself.

FIG. 15 is a view showing a multi-layer neural network having an adaptive segmentation of quantizer neuron architecture (ASQA). In the drawing, the neural network is composed of three layers which are: an input layer consisting of neurons 10-1 and 10-2 to which input vectors are inputted; an intermediate layer consisting of neurons 11-1 to 11-5 each having, as internal information, the value of its state energy and the connection load of a synapse with the corresponding output neuron: and an output layer consisting of neurons 12-1 and 12-2 for integrating the outputs of the individual neurons in the intermediate layer. Here, it is assumed that only neurons in two adjacent layers are connected and that neurons in the same layer are not connected to each other. Network interconnection information indicates the connection between the neurons in the input layer and the neurons in the intermediate layer. Specifically, the network interconnection information includes information on the connection between the neuron 10-1 and the neurons 11-1 and 11-3 and information on the connection between the neuron 10-2 and the neurons 11-2, 11-4, and 11-5. Although consideration is not given to the connection between the neurons in the intermediate layer and the neurons in the output layer, each neuron in the intermediate layer is connected to a neuron in the output layer via the connection load of its synapse.

The state energy of each neuron in the intermediate layer include a mean value, variance, and number of learnings. Here, the mean value indicates the average of the values of a data sequence inputted to a neuron. Learning in the neural network is accomplished by updating the internal information of its neurons.

For each input neuron, multi-dimensional space in the neural network is divided into segments the number of which corresponds to the number of the neurons in the intermediate layer, so that each of the neurons in the intermediate layer occupies its own segment of space. If an input vector is inputted to the neural network, a certain neuron in the intermediate layer responds to it and transmits a signal to each neuron in the output layer, while not transmitting signals to the other neurons in the intermediate layer. By calculating the sum of products of the outputs of the neurons in the intermediate layer and the connection loads of their synapses, each output neuron integrates the outputs of the neurons in the intermediate layer. After that, the output values of the output neurons are compared with each other so as to set the number of an output neuron having the largest output value as a recognition result.

Figure 16:
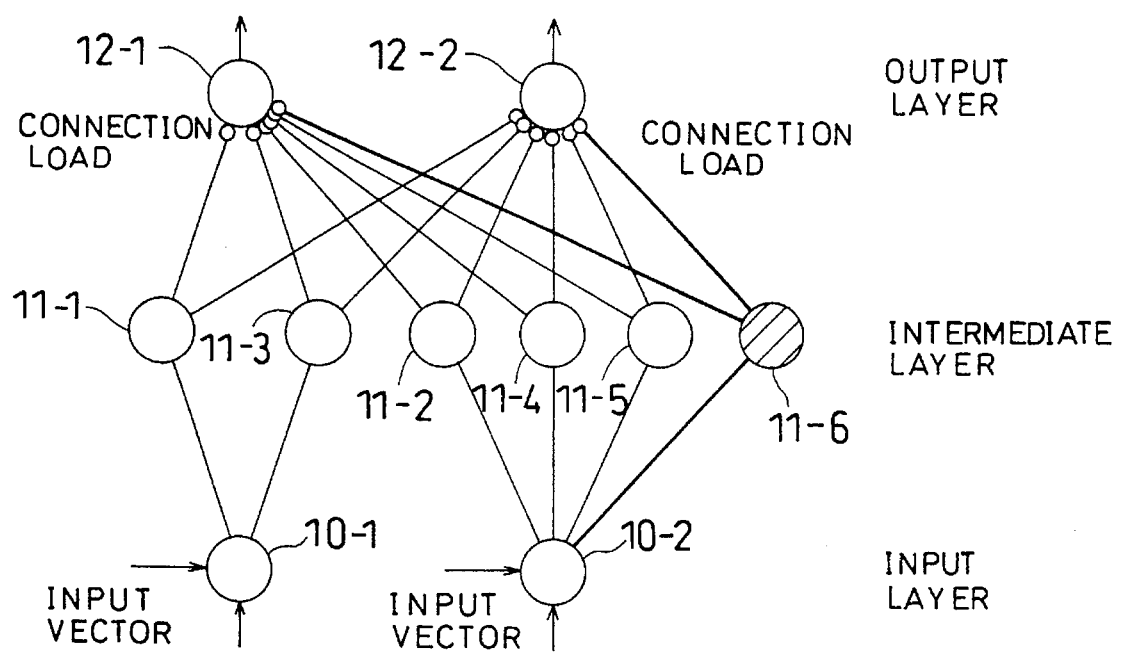
FIG. 16 is a view showing the neural network in the case where a neuron proliferates in the neural network of FIG. 15.

In the case where the internal information of neurons is updated, if the state energy of the neuron 11-5 exceeds a specified threshold value, e.g., the neuron 11-5 is split as shown in FIG. 16, so as to generate a neuron 11-6. Consequently, a new network is generated by the neuron 11-6, the neuron in the input layer, and the neurons in the output layer. At this point, a proliferation history of neurons is also stored as the network interconnection information. The proliferation history is composed of the internal information of neurons at the time of splitting and information indicating an event that the neuron 11-5 has been split into new neurons 11-5 and 11-6.

FIGS. 17(a) and 17(b) show the splitting of the neuron in two dimensions. A boundary condition for the new neurons 11-5 and 11-6 at the time of splitting is stored as a set of information in the proliferation history. The boundary condition is assumed to be the mean value of the neuron 11-5 immediately before splitting. The connection loads of the synapses between the neuron 11-6 and individual output neurons are duplicated from the connection loads of the synapses between the neuron 11-5 and the individual output neurons.

Thus, by not only changing the values of the connection loads of synapses but also dynamically changing the structure itself of the network, a network scale conforming to the information processing in question can be realized.

Next, a description will be given to the structure of the information processing apparatus according to the first embodiment, which implements the above neural network.

FIG. 1 is a block diagram showing the structure of the information processing apparatus according to the present embodiment. In the drawing, a reference numeral 101 designates a storage unit for storing the network interconnection information, 102 designates a storage unit for storing the internal information of neurons, which is a collection of specific information on individual neurons, a reference symbol IV designates an input vector, 104 designates a calculating unit having functions of manipulating the network interconnection information by writing and reading data in and from the storage unit 101 and manipulating the internal information of neurons by writing and reading data in and from the storage unit 102, 105 designates a register for holding the result of retrieval performed by the calculating unit 104 with respect to the network interconnection information stored in the storage unit 101, and 106 designates a register for holding the result of an access made by the calculating unit 104 to the storage unit 102. Here, to each neuron is assigned a specific neuron number.

Next, a description will be given to the operation of the information processing apparatus thus constituted.

At first, if the input vector IV is inputted to the calculating unit 104, the calculating unit 104 performs retrieval in accordance with the network interconnection information stored in the storage unit 101, so as to specify a neuron which responds to the input vector IV. Subsequently, the neuron number of the specified neuron is held in the register 105. The calculating unit 104 then accesses to the storage unit 102 for storing the internal information of neurons by means of the neuron number held in the register 105. If it is assumed that the amount of internal information of each neuron is represented by n words, it is possible to make an access to the internal information of the specified neuron by using an address represented by (neuron number×n words). Since the connection load of a synapse between the specified neuron and each of the output neurons is stored as the internal information of the specified neuron at the address, the calculating unit 104 can calculate the sum of products of the outputs of the neurons and the connection loads of their synapses by holding the internal information in the register 106. By repeating such a sequence of operations by the number of times corresponding to the number of input vectors, a recognition process is executed.

By rewriting the network interconnection information stored in the storage unit 101, a neural network of different structure can be built easily. In this case, the internal information of neurons stored in the storage unit 102 is rewritten as well in accordance with the changing of the content of the storage unit 101. To change the contents of the storage units, calculations may be performed on an external calculating unit so that the value obtained through the calculation is written directly in the storage units 101 and 102.

Thus, by providing the storage unit for storing the network interconnection information in the information processing apparatus according to the first embodiment, it becomes possible to implement a neural network the interconnection of which can be changed.

Next, a description will be given to the case where the calculations are performed in the information processing apparatus according to the present embodiment, not in the external calculating unit, so that the calculation result is written in the storage units 101 and 102.

Learning in a multi-layer neural network having an adaptive segmentation of quantizer neuron architecture is performed by updating the internal information of the neurons in the intermediate layer. Specifically, the learning is accomplished by updating the state energy (e.g., the mean value, variance, and number of learnings) of each neuron in the intermediate layer and the connection loads of its synapses with each output neuron.

At the time of learning, the internal information of the neuron that should learn is read from the storage unit 102 and held in the register 106. The calculating unit 104 rewrites the internal information of the neuron held in the register 106 so that the updated internal information of the neuron is written at the same address as that from which information is read in the storage unit 102. If the splitting of the neuron occurs at this point, a specific neuron number is assigned to the newly generated neuron and the newly generated neuron is written at an address represented by (neuron address×n words) in the storage unit 102. Subsequently, the calculating unit 104 accesses to the storage unit 101 so as to write the boundary condition at the time of splitting and to change the network interconnection information. Here, the boundary condition is assumed to be the mean value of the neuron immediately before splitting.

In this manner, the structure of the network can be changed inside the information processing apparatus. Since it is not necessary to use another calculating unit, the processing time can be reduced, thereby enhancing practicality.

(Second Embodiment)

Below, an information processing apparatus according to a second embodiment of the present invention will be described with reference to the drawings. The neural network to be implemented here is a multi-layer neural network having an adaptive segmentation of quantizer neuron architecture, similarly to the first embodiment.

A description will be given first to the information processing apparatus according to the present embodiment.

Figure 2:
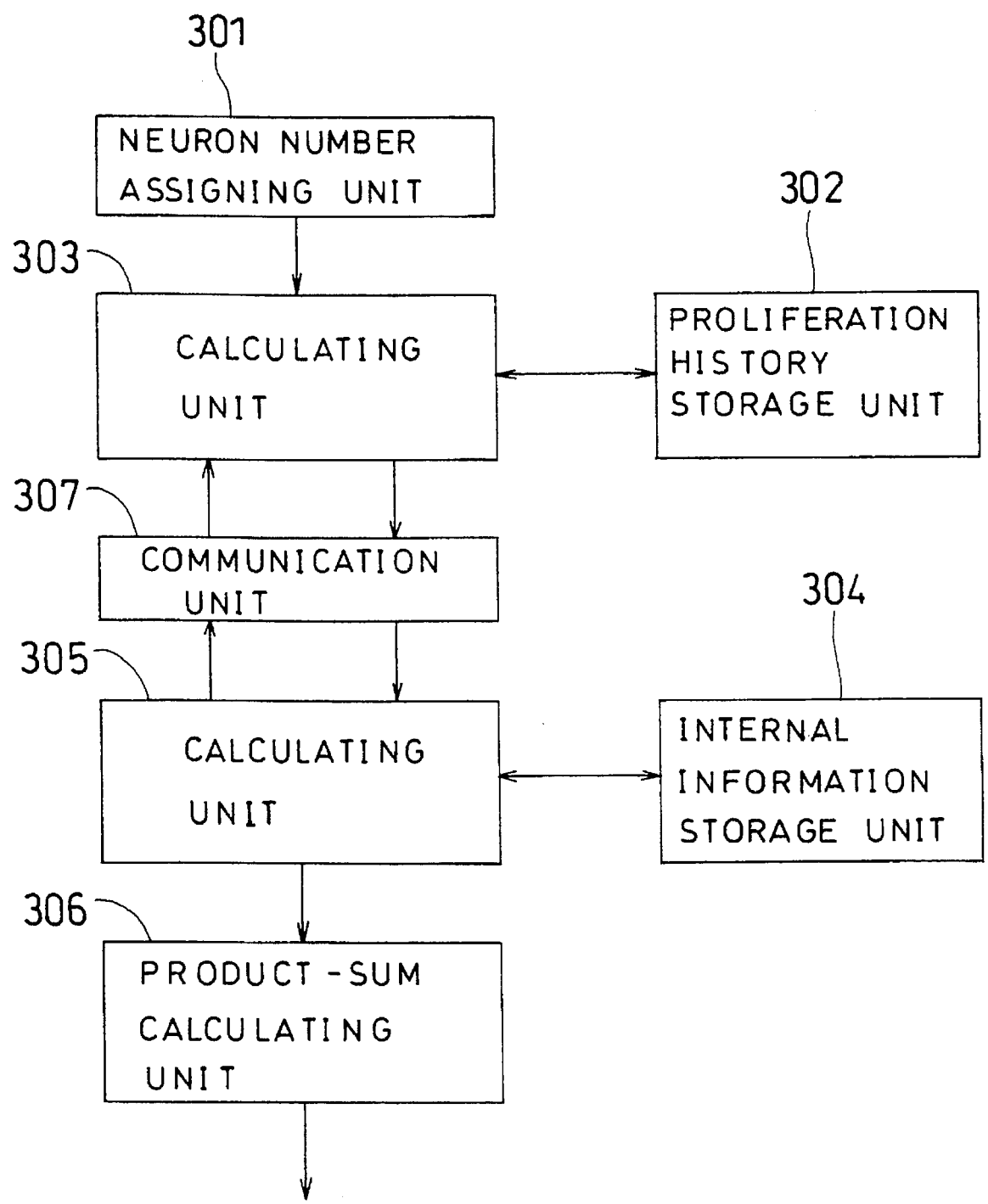
FIG. 2 is a block diagram showing an information processing apparatus according to a second embodiment of the present invention.

FIG. 2 is a block diagram showing the structure of the information processing apparatus according to the present embodiment. In the drawing, a reference numeral 301 designates a neuron number assigning unit for assigning a neuron number to a neuron, 302 designates a proliferation history storage unit for storing the proliferation history of a neuron, 308 designates a calculating unit having an address and data bus to the proliferation history storage unit 302 so as to manipulate the proliferation history stored in the proliferation history storage unit 302, 304 designates an internal information storage unit for storing the internal information of neurons, which is a collection of specific information on individual neurons, 305 designates a calculating unit having an address and data bus to the internal information storage unit 304 so as to manipulate the internal information of neurons stored in the internal information storage unit 304, 306 designates a product-sum calculating unit for calculating the sum of products of the outputs of neurons and the connection loads of their synapses, 307 designates a communication unit for providing communication between the calculating unit 308 and calculating unit 305.

Next, a description will be given to the manner in which a process of proliferating a neuron in the intermediate layer of the neural network is represented and stored in the proliferation history storage unit 302.

Figure 3:
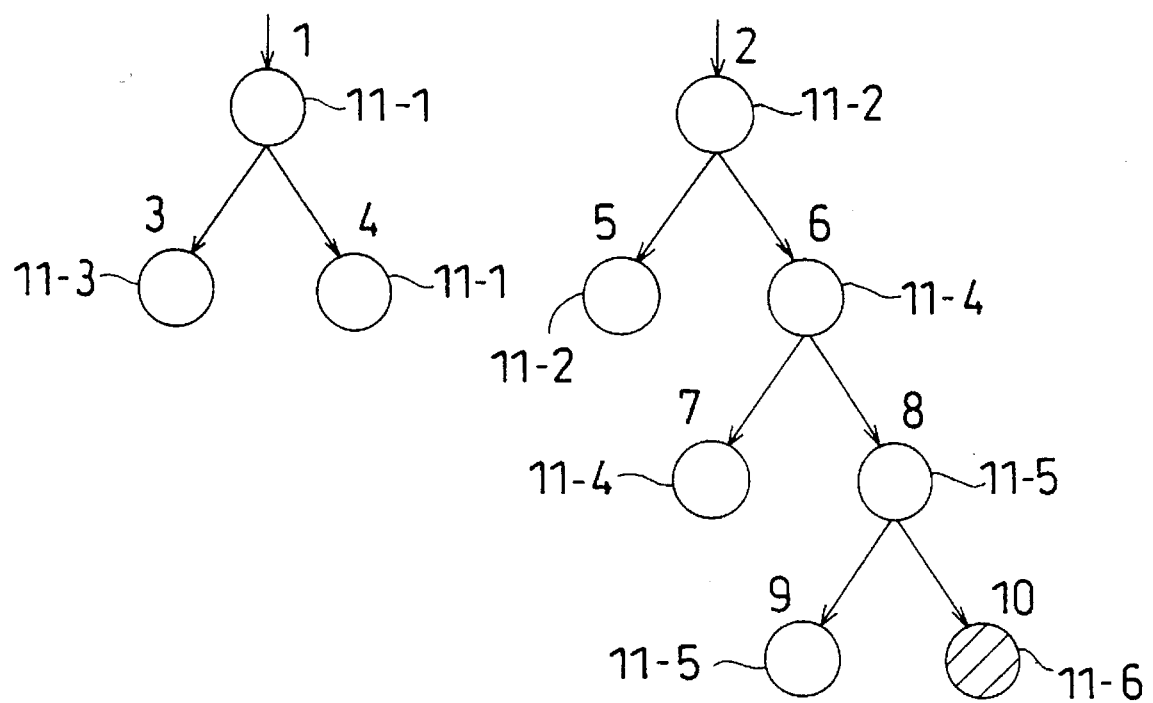
FIG. 3 is a view showing neuron numbers and node numbers assigned to neurons in a neural network which is implemented by the information processing apparatus according to the second embodiment.
Figure 13:
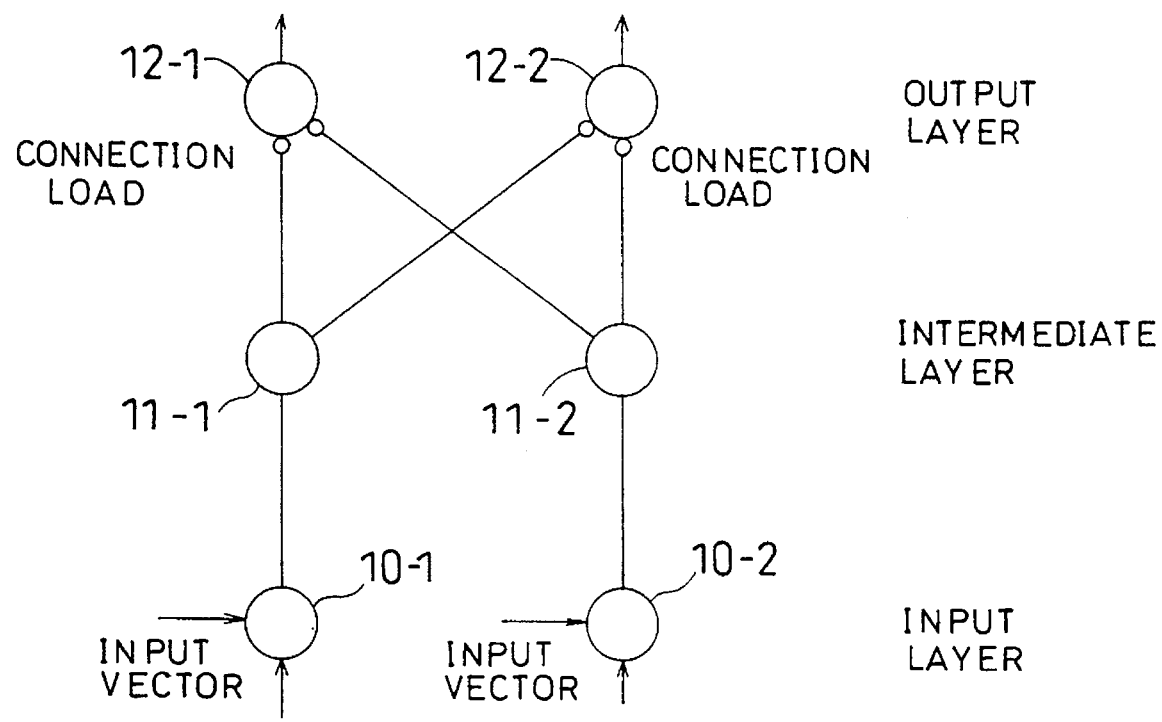
FIG. 13 is a view showing a neural network in the initial state.
Figure 14:
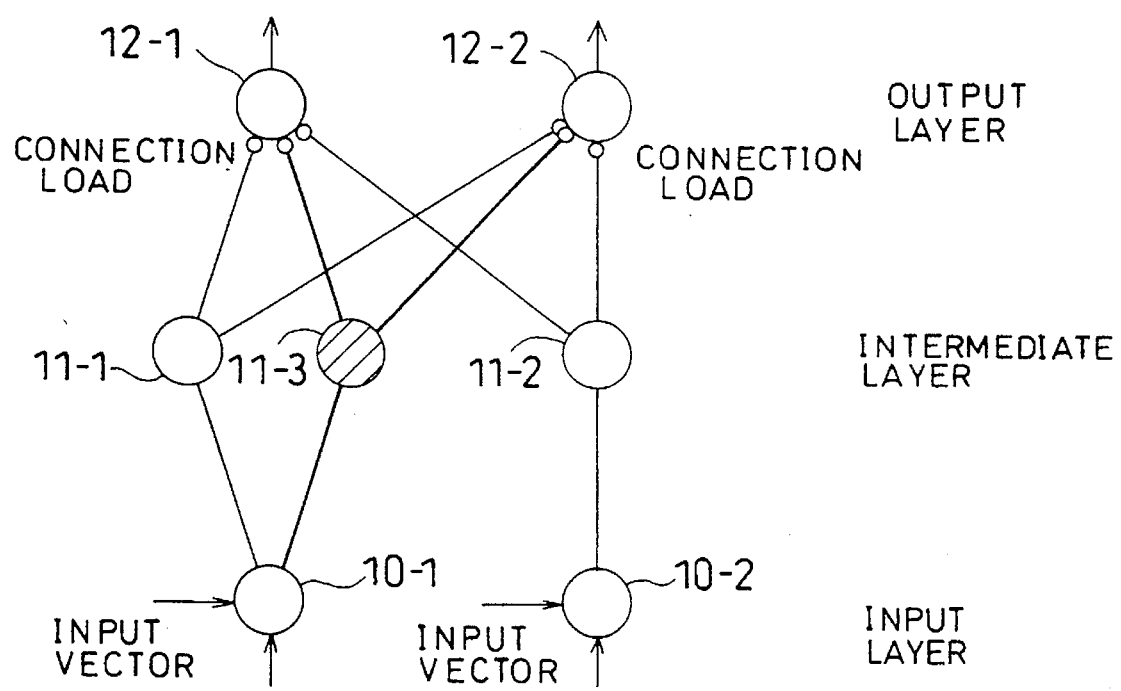
FIG. 14 is a view showing the neural network in the case where a neuron proliferates in the neural network in the above initial state.

FIG. 3 shows neuron numbers and node numbers to be assigned to the neurons in the intermediate layer. First, a description will be given to the assignment of the neuron numbers to the neurons. Since the number of neurons present in the intermediate layer is two in the initial state, numbers in ascending order, such as 11-1 and 11-2, are assigned to the two neurons. FIG. 13 shows the neural network in the initial state. Next, if the neuron indicated by the neuron number 11-1 is split to proliferate, a number subsequent to the number of the latest neuron number, such as 11-3, is assigned to the newly generated neuron. FIG. 14 shows the proliferation of the neuron and the assignment of the neuron number. Thus, neuron numbers will be sequentially assigned every time a neuron in the intermediate layer is split, irrespective of the number of the corresponding input neuron.

To constitute the network interconnection information, neuron numbers assigned to individual neurons and a proliferation history which indicates the process in which the neurons have proliferated are required. To produce the proliferation history, every time a neuron proliferates, a neuron number is assigned to the newly generated neuron as well as node numbers are given to the two neurons obtained after splitting. It will be appreciated from the neuron proliferation history of FIG. 3 that the node number of the neuron which had the neuron number of 11-2 before splitting is 2, that the neuron having the node number 2 has further been split into the neurons having node numbers 5 and 6, and that the neuron having the node number 6 has further been split into the neurons having node numbers 7 and 8, respectively. The node numbers to be assigned are ascending serial numbers such as k and (k+1).

Figure 4:
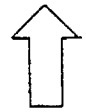
FIGS. 4(a) and 4(b) are views showing the content of a proliferation history storage unit in the information processing apparatus according to the second embodiment.
Figure 5:
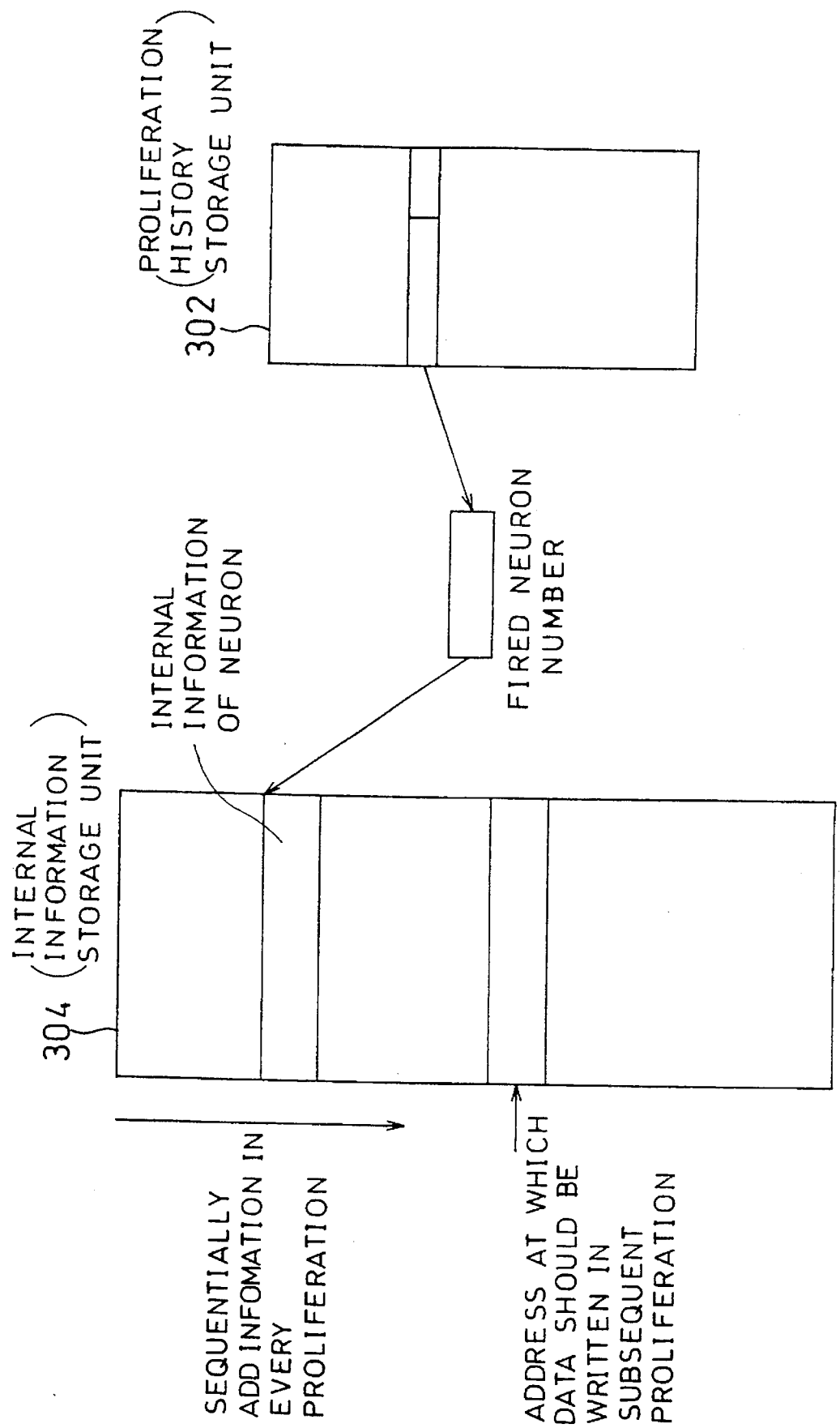
FIG. 5 is a view showing an access made by a calculating unit 305 to an internal information storage unit by using a neuron number in the information processing apparatus according to the second embodiment.

FIGS. 4(a) and 4(b) show the neuron numbers and node numbers written in the proliferation history storage unit 304. In the drawings, if a neuron is split, e.g., 1 is written in the end field, while the node number of one of the two neurons which were newly generated through splitting is written in the number field. Here, the node number of the neuron having the smaller number is written. In the boundary condition field is written the boundary condition at the time of splitting. Here, the boundary condition is assumed to be the mean value of the neuron immediately before splitting. Once the node number was written in the number field, an address having the same number as the written node number is searched so that the neuron number of the neuron having the written node number is written in the number field at the searched address. In the number field at the address subsequent to the searched address is written the neuron number of the other of the two neurons which were newly generated through splitting. In the initial state, 0 is written in every end field.

A specific description will be given to the case where a neuron in the intermediate layer of the neural network of FIG. 15 is split as shown in FIG. 16.

Prior to splitting, in the number field at the address 8 in the proliferation history storage unit 302 is written a neuron number 11-5, while 0 (indicating an end) is written in the end field at the same address, as shown in FIG. 4(a). If the neuron having the neuron number 11-5 is split into neurons having new neuron numbers 11-5 and 11-6, a node number 9 is written in the number field at the address 8 in the proliferation history storage unit 302, while 1 (indicating the splitting of a neuron) is written in the end field at the same address and a boundary condition A8 is written in the boundary condition field at the same address, as shown in FIG. 4(b). The boundary condition A8 indicates the mean value of the neuron having the neuron number 11-5 immediately before splitting. At the same time, the neuron number 11-5 is written in the number field at the address 9 in the proliferation history storage unit 302, while the neuron number 11-6 is written in the number field at an address 10.

Next, a description will be given to the operation of the information processing apparatus according to the second embodiment.

In FIG. 2, the calculating unit 303 executes the retrieval of a neuron number stored in the proliferation history storage unit 302. Specifically, by using as an initial value an address having the same number as the node number assigned to any neuron in the input layer (e.g., the node number 1 for a neuron having a neuron number 10-1 and the node number 2 for a neuron having a neuron number 10-2), the calculating unit 303 retrieves the value in the number field at another address at which 0 is set in its end field, i.e., a neuron number. The calculating unit 303 thus finds out the neuron number of a fired neuron so that the neuron number obtained is transferred to the calculating unit 305 via the communication unit 307.

The calculating unit 305 then makes an access to the internal information storage unit 304 using the neuron number of the fired neuron. If it is assumed that the amount of internal information on each neuron is n words, the access can be made by calculating an address represented by (neuron number ×n words). If neuron numbers are assigned to neurons in the order in which the neurons were generated by proliferation, the internal information storage unit 304 can be used efficiently without suffering from fragmentation, so that a reduction in the storage capacity can be expected.

The product-sum calculating unit 306 executes the calculation of the sum of products of the output of the fired neuron and the connection loads of their synapses by using the internal information of neurons stored in the internal information storage unit 304.

At the time of learning, the calculating unit 305 updates the internal information of the neuron that should learn. If the requirement for the splitting of the neuron is satisfied, the boundary condition is transferred to the calculating unit 303 via the communication unit 307, so that the calculating unit 303 performs the sequence of processes mentioned above by using the updated internal information of the neuron. Through the updating of the network interconnection information stored in the proliferation history storage unit 302, a new neural network is constituted.

The communication unit 307 is for synchronizing the calculating units 303 and 305. If the neuron number of the fired neuron is specified, the calculating unit 305 can read out of the internal information storage unit 304 the internal information of the neuron corresponding to the neuron number. In the mean time, the calculating unit 303 can execute the processing of a subsequent input neuron. This is because the proliferation history storage unit 302 and internal information storage unit 304 operate independently of the calculating units 303 and 305, respectively. Consequently, the calculating units 303 and 305 can be operated simultaneously. However, it is necessary for the communication unit 307 to provide synchronization in order to indicate that the internal information read from the internal information storage unit 304 by the calculating unit 305 is on the neuron having the neuron number specified by the calculating unit 303. Specifically, a method using semaphore control and a single register and a method using a FIFO memory can be employed.

Thus, with the information processing apparatus according to the second embodiment, there can be implemented a neural network the interconnection of which can be changed by controlling the process in which neurons proliferate, the structure of the network, and the interconnection of the neurons by using only the numbers assigned to the neurons.

(Third Embodiment)

Below, an information processing apparatus according to a third embodiment of the present invention will be described with reference to the drawings. The neural network to be implemented here is a multi-layer neural network having an adaptive segmentation of quantizer neuron architecture, similarly to the first embodiment.

Figure 6:
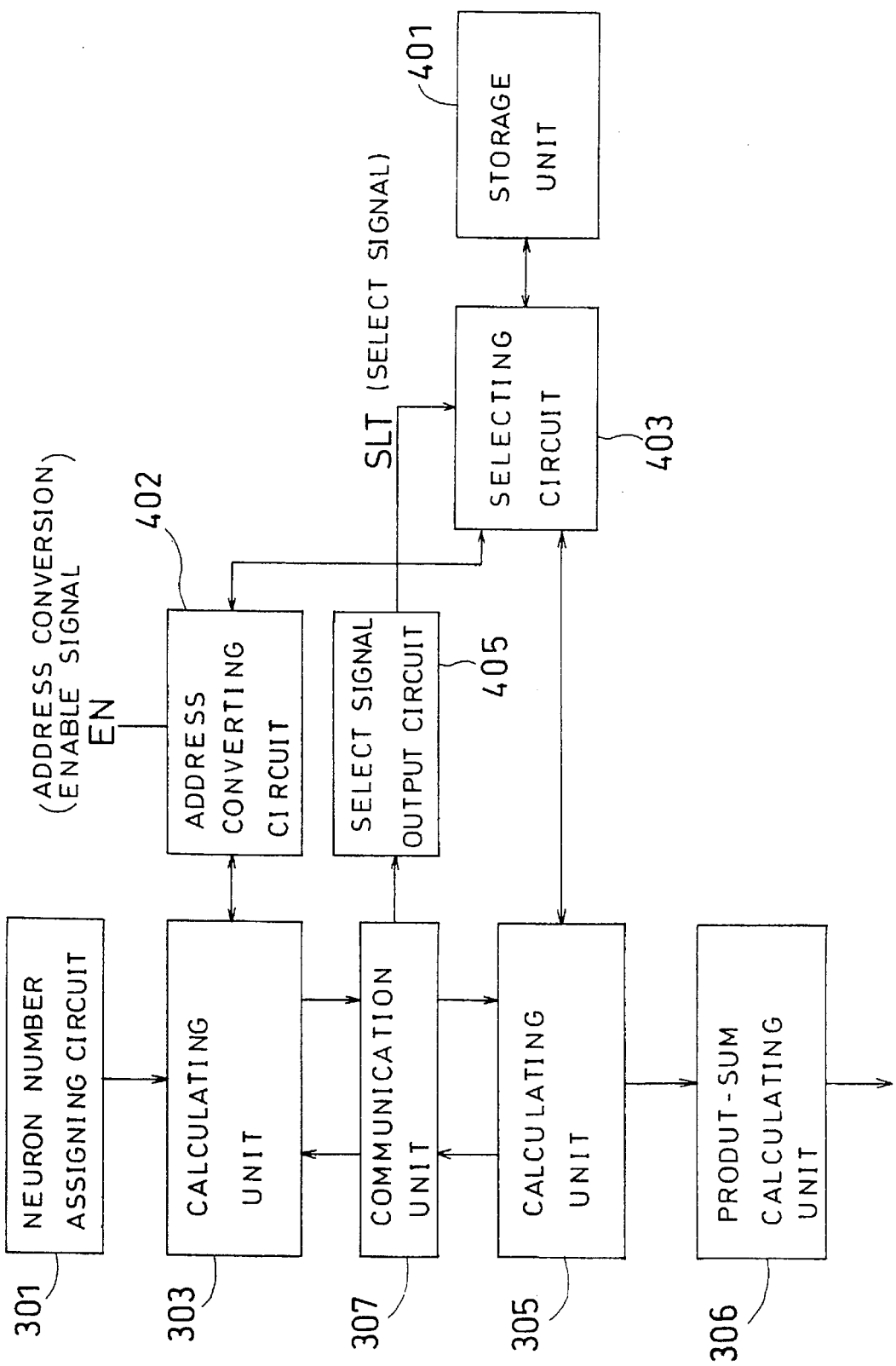
FIG. 6 is a block diagram showing an information processing apparatus according to a third embodiment of the present invention.

FIG. 6 is a block diagram showing the structure of the information processing apparatus according to the present embodiment. The detailed description of the same components as used in the second embodiment shown in FIG. 2 will be omitted by providing the same reference numerals.

In FIG. 6, a reference numeral 401 designates a storage unit for storing the internal information of neurons and network interconnection information, 402 designates an address converting circuit for converting an address signal from the calculating unit 303 to the storage unit 401, 403 designates a selecting circuit for selecting either address and data bus to the storage unit 401 owned by the calculating unit 303 or address and data bus to the storage unit 401 owned by the calculating unit 305, a reference symbol SLT designates a select signal to the selecting circuit 403, a reference numeral 405 designates a select signal output circuit for outputting the select signal SLT, and EN designates an address conversion enable signal for activating the address converting circuit 402.

Figure 7:
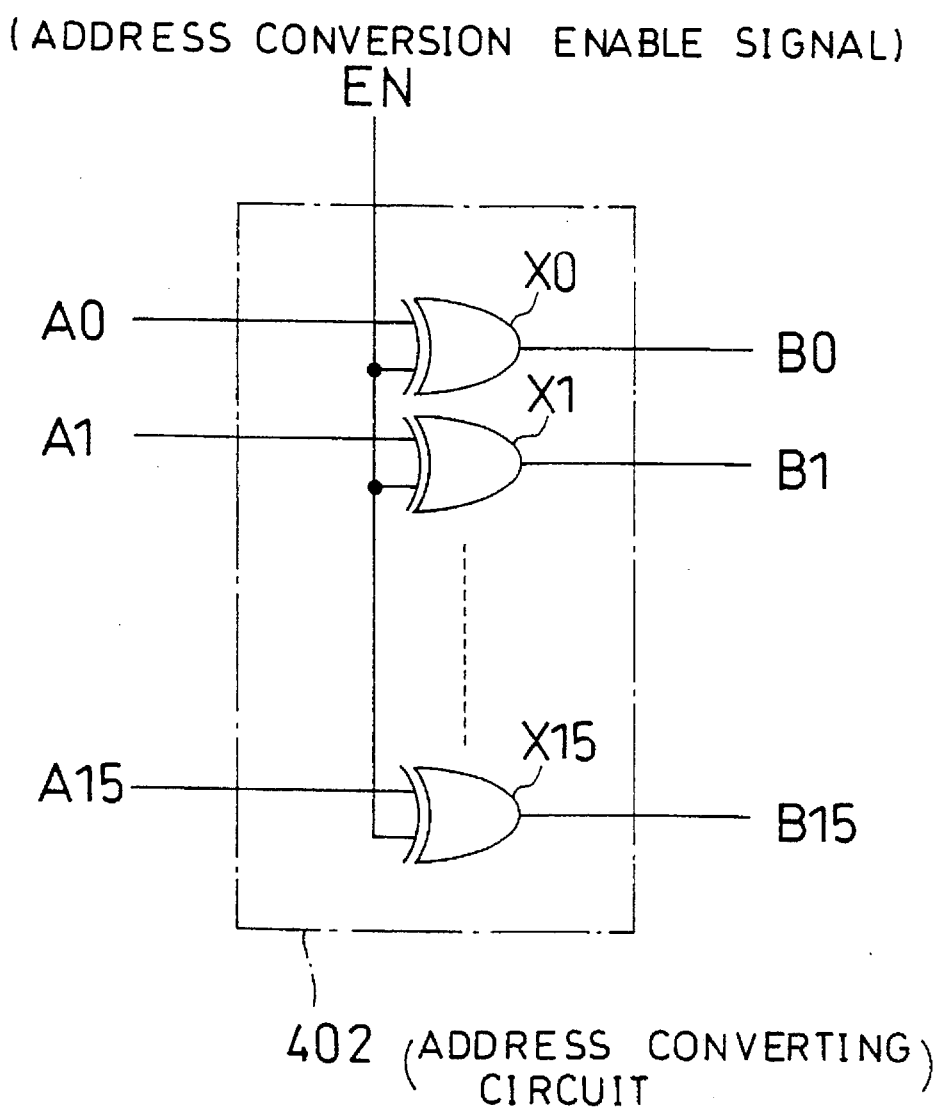
FIG. 7 is a circuit diagram showing an address converting circuit in the information processing apparatus according to the third embodiment.
Figure 9:
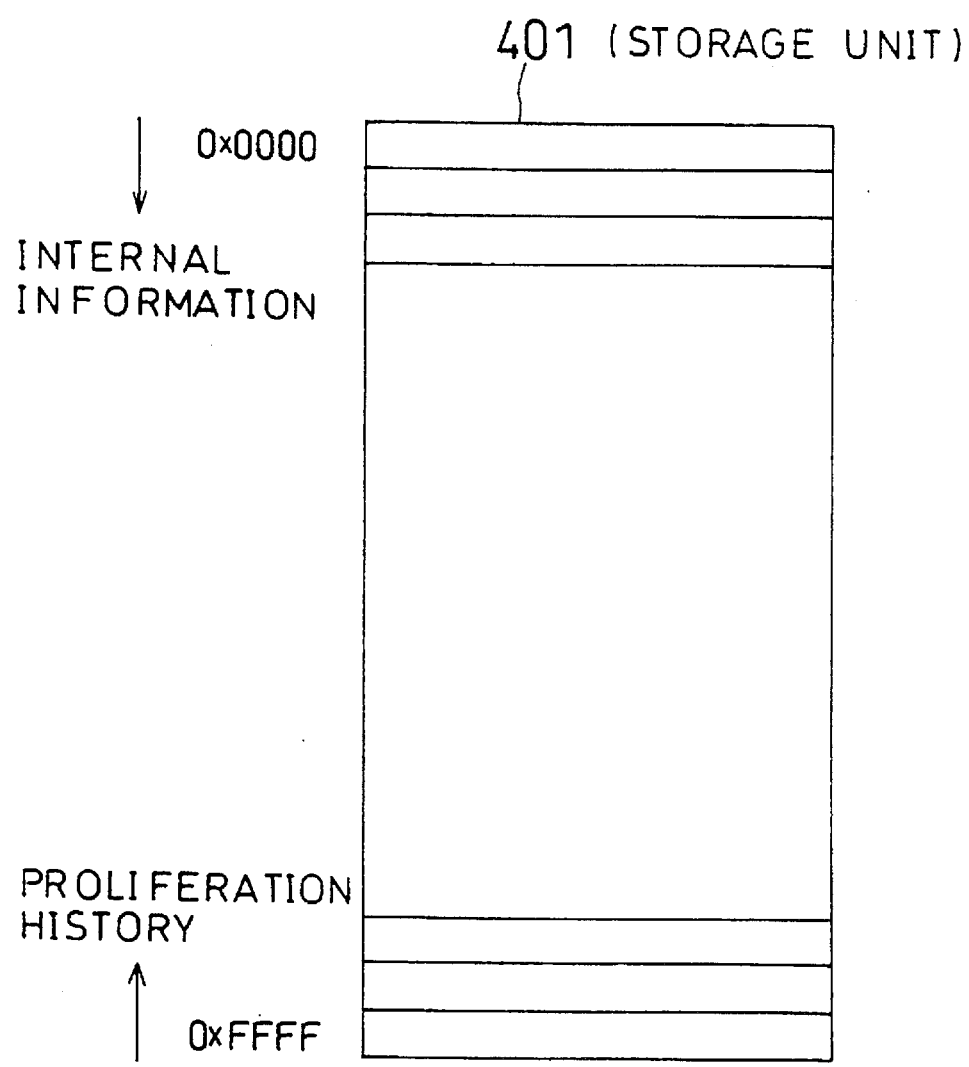
FIG. 9 is a view showing the writing of proliferation history and internal information of neurons in the storage unit of the information processing apparatus according to the third embodiment.

FIG. 7 is a circuit diagram showing an example of the address converting circuit 402. Here, it is assumed that the bit width of an address in the calculating units 303 and 305 is 16 bits for the sake of simplicity. In the drawing, A0 to A15 designate input addresses from the calculating unit 303, B0 to B15 designate output addresses outputted from the address converting circuit 402, and X0 to X15 designate exclusive-OR circuits. If the address conversion enable signal EN becomes output addresses B0 to B15 were obtained by inverting the logic of each bit at the input addresses A0 to A15, as shown in FIG. 8. If the selecting circuit 403 selects the address from the calculating unit 303, the data from the calculating unit 303 is sequentially written in the storage unit 401 from its highest order address downward, as shown in FIG. 9. Conversely, if the selecting circuit 403 selects the address from the calculating unit 305, the data from the calculating unit 305 is sequentially written in the storage unit 401 from its lowest order address upward. Thus, it becomes possible to store two types of information in a single storage unit. As a matter of course, control is required so that the two types of information is not written at the same address. Specifically, there can be employed, e.g., a method in which two addresses at which two types of information is to be written are held and compared with each other.

Although it was already described in the second embodiment that the calculating units 303 and 305 can operate independently of each other, each of them requires mutually exclusive control if they use the same storage unit in common. The select signal output circuit 405 functions as a means for implementing such control. The select signal output circuit 405 outputs the select signal SLT by utilizing the communication unit 307 for synchronizing the calculating units 303 and 305. In the case where data is transferred from one of the calculating units 303 and 305 to the other, if it is assumed that a neuron number is transferred from the calculating unit 303 to the calculating unit 305, for example, the calculating unit 303 retrieves the proliferation history stored in the storage unit 401 in order to specify the neuron. For this purpose, the selecting circuit 403 selects the address and data bus from the calculating unit 303, which was outputted from the address converting circuit 402. If the neuron was specified, a neuron number indicating the neuron is transferred from the calculating unit 303 to the calculating unit 305 via the communication unit 307. After transfer, the selecting circuit 403 selects the address and data bus from the calculating unit 305. After the calculating unit 305 obtained necessary information from the storage unit 401, the selecting circuit 403 selects the address and data bus from the calculating unit 303 again.

If the calculating unit which accesses the storage unit 401 is changed from the calculating unit 303 to the calculating unit 305, e.g., the calculating unit 303 which has transferred data is stopped so that it does not access the storage unit 401 any more. After the access by the calculating unit 305 to the storage unit 401 is completed, the operation of the calculating unit 303 is resumed under control.

Thus, with the information processing apparatus according to the third embodiment, it becomes possible to store two types of information in a single storage unit by means of the address converting circuit, so that the storage unit can be used efficiently without modifying the calculating units 303 and 305 at all, thereby expecting a reduction in the storage capacity.

If the value of the address conversion enable signal EN to be inputted to the address converting circuit 402 is set to 0 in the present embodiment, a neural network similar to the second embodiment can easily be implemented.

Although the present embodiment has been described on the assumption that the number of the input neurons is two, the number of the output neurons is two, and the number of the neuron in the intermediate layer is 5 to 6, it will be appreciated that these numbers can be changed without being limited thereto.

(Fourth Embodiment)

Below, an information processing apparatus according to a fourth embodiment of the present invention will be described with reference to the drawings.

A description will be given first to the structure of the information processing apparatus according to the present embodiment.

Figure 10:
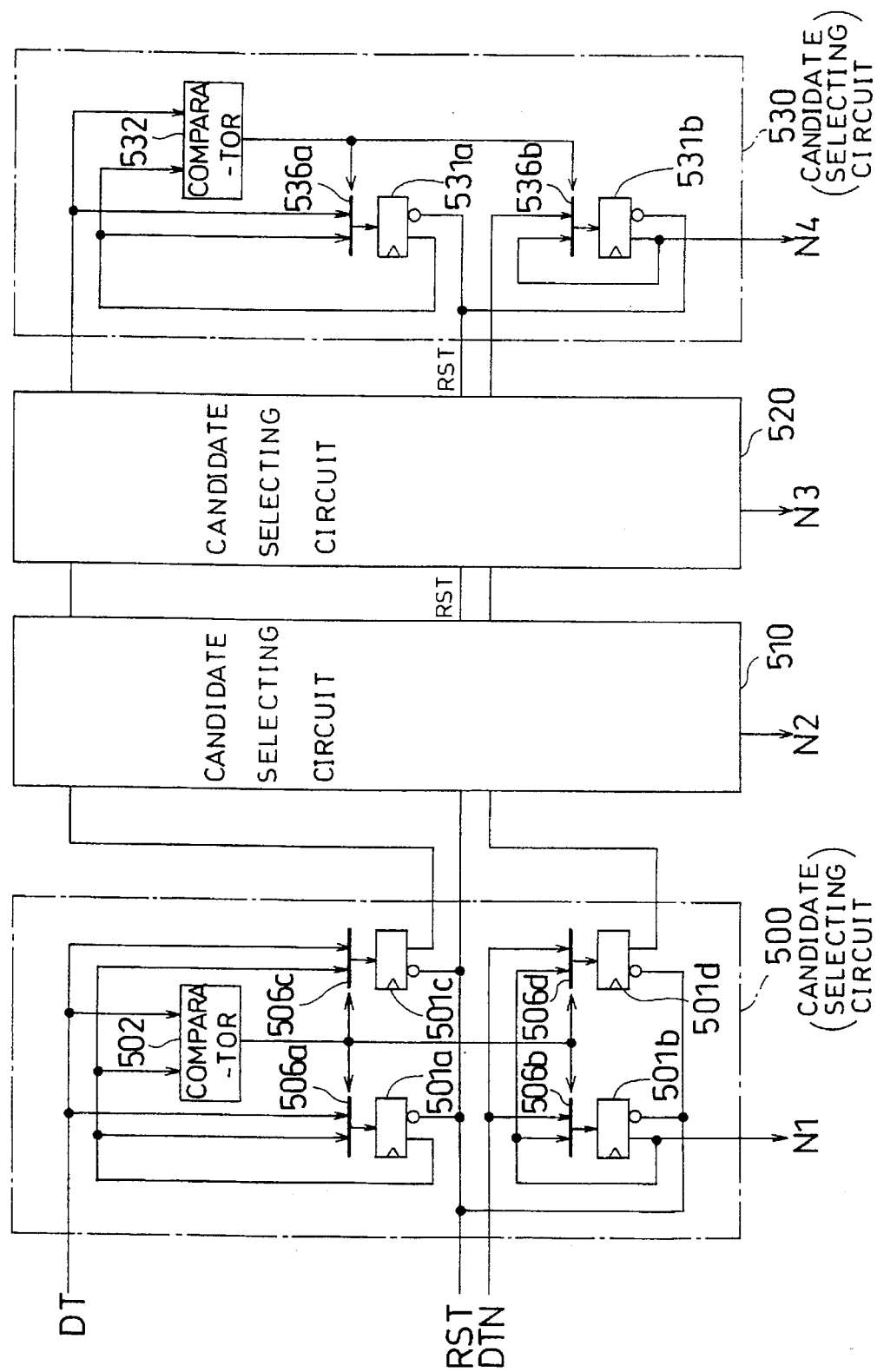
FIG. 10 is a circuit diagram partially showing an information processing apparatus according to a fourth embodiment of the present invention.

FIG. 10 is a circuit diagram showing the structure of the information processing apparatus according to the present embodiment. Here, it is assumed for the sake of simplicity that the number of candidates to be selected for a recognition result is four. In the drawing, reference numerals 501a to 501d, 531a, and 531b designate registers, 502 and 532 designate comparators for outputting a comparison result MSB. A reference symbol DT designates data to be inputted, RST designates a reset signal for the registers 501a to 501d, 531a, and 531b, and DTN designates a data number assigned to data DT. Reference numerals 506a to 506d, 536a, and 536b designate multiplexers and N1, N2, N3, and N4 designate data numbers assigned to data sets having the largest, second largest, third largest, and fourth largest values, respectively, and serving as candidates to be selected. By assigning, as the data numbers, the same numbers as the neuron numbers of the output neurons to the data sets, the N1 to N4 become candidates for a recognition result. The comparators 502 and 532 output comparison results in one cycle.

Of the two sets of data compared with each other, the registers 501a and 531a store the data set having the larger value, while the register 501c stores the data set having the smaller value. The registers 501b and 531b store the data numbers assigned to the data stored in the registers 501a and 531a, respectively, while the register 501d stores the data number assigned to the data stored in the register 501c.

The registers 501a to 501d, comparator 502, and multiplexers 506a to 506d constitute a candidate selecting circuit 500, while the registers 531a, 531b, comparator 532, and multiplexers 536a and 536b constitute a candidate selecting circuit 530. It is assumed that the structure of each of candidate selecting circuits 510 and 520 is the same as that of the candidate selecting circuit 500 and that the registers use the same clock in common.

Next, a description will be given to the operation of the information processing apparatus thus constituted. Here, it is assumed that the total number of data sets to be compared is N.

First, each of the registers is reset by the reset signal RST so that its value is set to 0. Subsequently, the sets of data DT and the data numbers DTN assigned to the sets of data DT are inputted at the same time. The set of data DT inputted first and the output of the register 501a are compared with each other by the comparator 502, so that the multiplexers 506a to 506d select their own outputs by using a comparison result MSB from comparator 502 and write them in the registers 501a to 501d, respectively. These operations are repeatedly performed by the number of times corresponding to the number of data sets, i.e., N times.

Then, in the N-th cycle, that set of data having the largest value of the N sets of data is written in the register 501a and the data number of the set of data having the largest value is written in the register 501b. As a result, that candidate having the largest value of the candidates to be selected is outputted from the candidate selecting circuit 500.

In the subsequent (N+1)-th cycle, the data number of that set of data having the second largest value of the N sets of data is outputted from the candidate selecting circuit 510. In the (N+2)-th cycle, the data number of that set of data having the third largest value of the N sets of data is outputted from the candidate selecting circuit 520. In the (N+3)-th cycle, the data number of that set of data having the fourth largest value of the N sets of data is outputted form the candidate selecting circuit 530, thereby completing the selection of the four candidates.

In a conventional method of sequentially comparing the values of data sets two by two, considerable time is required, for the processing time is proportional to the number of data sets. In the case of finding ten candidates out of the N sets of data, for example, if it is assumed that the time required for one comparison is 1 cycle, N cycles are required for finding the candidate having the largest value and (N–1) cycles are required for finding the candidate having the second largest value, for it is among the (N–1) sets of data except for the set having the largest value. Likewise, there will be required (N–2) cycles, (N–3) cycles, . . . , (N–9) cycles in the subsequent process, so that the time corresponding to (10N–45) cycles is required in total, as shown by the following equation (1).

$$N+(N-1)+(N-2)+(N-3)+\ldots+(N-9) = 10N-45 \text{ [cycles]} \qquad (1)$$

If N=100, the time corresponding to 955 cycles will be required in order to select all the ten candidates. Thus, as the number of data sets to be inputted and the number of candidates to be selected increase, the number of cycles required for selection increases accordingly, so that the total processing time is elongated.

Similarly, if ten candidates are to be found among the N sets of data by using the information processing network according to the present embodiment, the number of cycles required for selecting all the ten candidates will be 109, as shown by the following equation (2).

$$100+(10-1)=109 \text{ [cycles]} \qquad (2)$$

In this manner, compared with the conventional embodiment, the processing speed can significantly be increased.

If n candidates are required, n candidate selecting circuits may be connected in cascade, thereby easily expanding the network.

(Fifth Embodiment)

Below, an information processing apparatus according to a fifth embodiment of the present invention will be described with reference to the drawings.

A description will be given first to the structure of the information processing apparatus according to the present embodiment.

Figure 11:
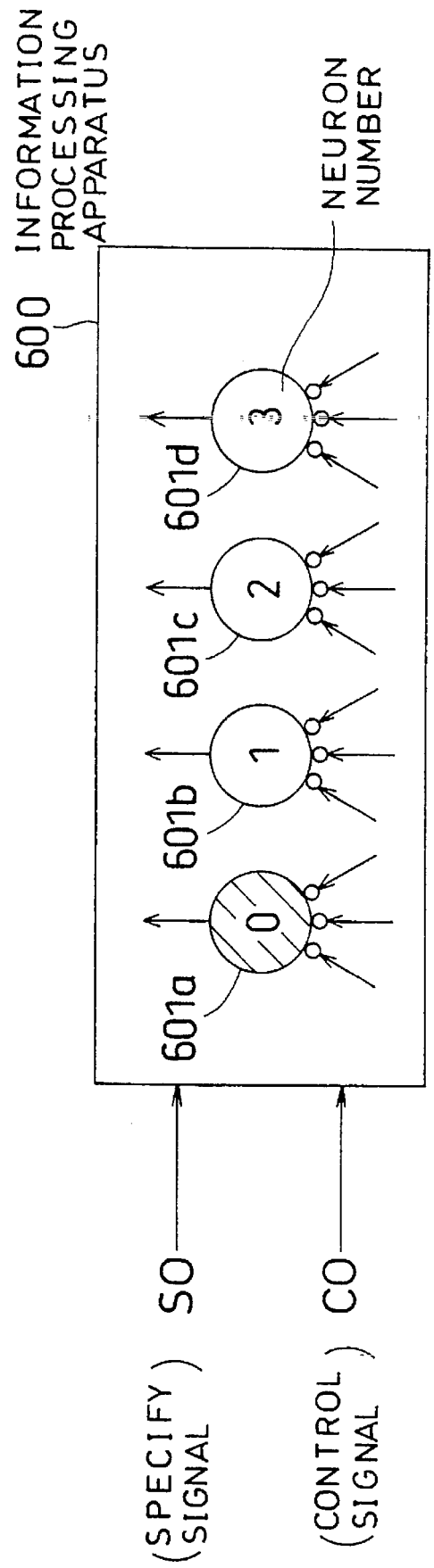
FIG. 11 is a perspective view of an information processing apparatus according to a fifth embodiment of the present invention.

FIG. 11 is a perspective view showing the structure of the information processing apparatus according to the present embodiment. In the drawing, a reference numeral 600 designates the information processing apparatus, reference numerals 601a to 601d designate neurons to which neuron numbers 0 to 3 are assigned, respectively, a reference symbol S0 designates a specify signal for specifying a neuron number assigned to a neuron, and C0 designates a control signal, which activates all teacher signals when its value is 1 and forcibly sets the values of all teacher signals to 0 when its value is 0.

Here, the delta rule will be used as an algorithm for the learning by a neuron. To put it briefly, the delta rule is a learning method whereby the connection load of a synapse of a neuron is changed using a difference between the output value of the neuron and the value of its teacher signal. It is assumed that the teacher signal has the binary of [0,1] and that learning is performed if the value of the teacher signal is 1, so as to fire the neuron.

A description will be given to the case where, if information is inputted to the information processing apparatus, learning is performed so as to fire the neuron $601a$ having the neuron number 0. The value of the control signal C0 is set to 1 and the neuron number 0 is specified by the specify signal S0. For the neuron $601a$ specified by the specify signal S0, the value of its teacher signal is set to 1. For the other neurons $601b$ to $601d$, the values of their teacher signals are set to 0. Each of the neurons performs learning by using the difference between its output value and the value of its teacher signal. In other words, the neurons having the neuron numbers 0, 1, 2, and 3 perform learning by means of their teacher signals 1, 0, 0, and 0, respectively.

Next, a description will be given to the case where a plurality of information processing apparatus thus constituted are used in order to implement an expanded neural network.

Figure 12:
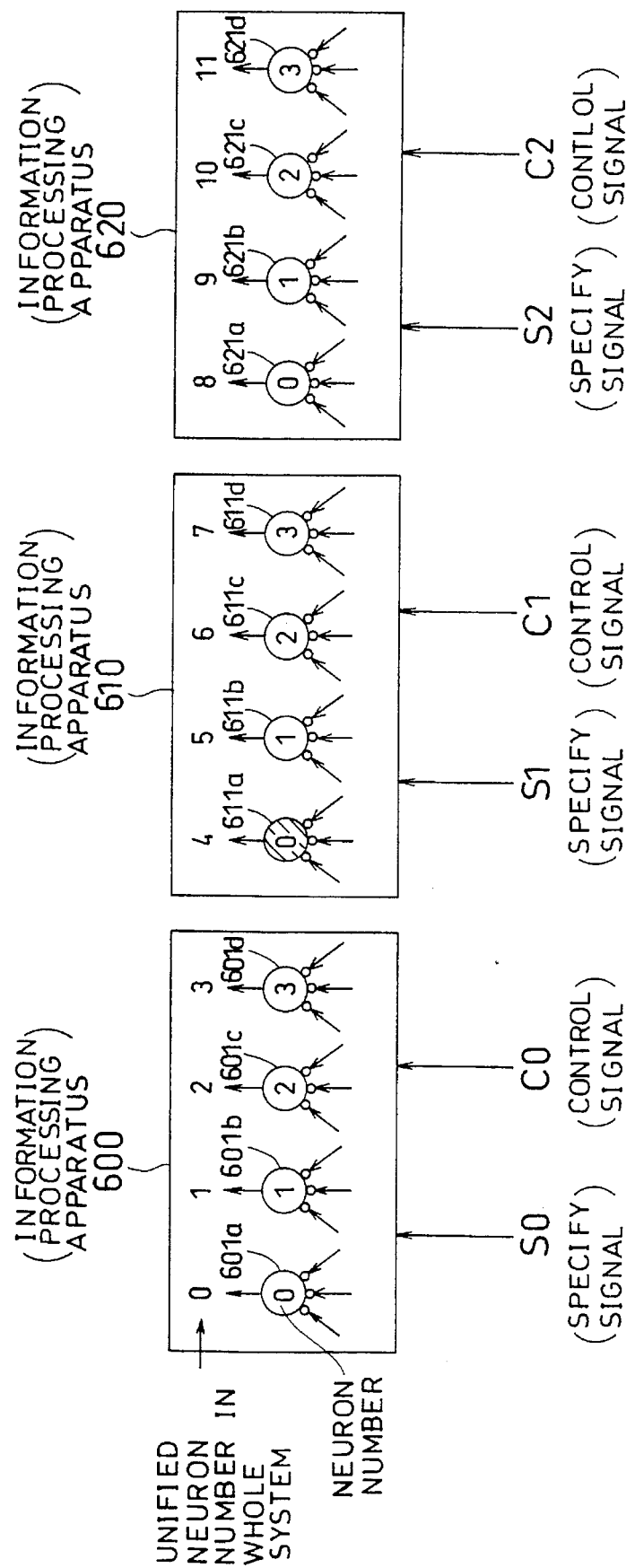
FIG. 12 is a view showing an information processing system constituted by a plurality of information processing apparatus according to the fifth embodiment.

FIG. 12 is a view showing an information processing system composed of three information processing apparatus. In the drawing, reference numerals 610 and 620 designate information processing apparatus having the same function as that of the information processing apparatus 600 of FIG. 11, $611a$ to $611d$ designate neurons to which the neuron numbers 0 to 3 are assigned respectively in the information processing apparatus 610, reference symbols S1 and S2 are specify signals each having the same function as that of the specify signal S0, and C1 and C2 are control signals each having the same function as that of the control signal C0.

Although the neuron numbers of the neurons in each information processing apparatus are 0 to 3, since the whole neural network has twelve neurons in total, unified neuron numbers 0 to 11 should be reassigned to all the neurons present in the network. For example, the unified neuron number 4 in the whole network is reassigned to the neuron $611a$, while the unified neuron number 11 in the whole network is reassigned to the neuron $621d$.

Next, a description will be given to the case where, if certain information is inputted, learning is performed so as to fire the neuron $611a$ having the unified neuron number 4 in the whole network.

Since the neuron having the unified neuron number 4 in the whole network corresponds to the neuron $611a$ having the inherent neuron number 0 in the information processing apparatus 610, the inherent neuron number 0 in the information processing circuit 610 is specified by the specify signal S1. Subsequently, the value of the control signal C1 is set to 1, while the values of the control signals C0 and C2 for the other information processing apparatus 600 and 620 are set to 0. By thus setting the values of the signals, no matter what neuron numbers are specified by the specify signals S0 to S2 in the information processing apparatus 600 and 620, learning can be performed with the value of its teacher signal being constantly set to 0. As a result, in place of the specify signals S0, S1, and S2, any one of the specify signals S0, S1, and S2 may be used in common, thereby reducing hardware scale.

As described above, if the plurality of information processing apparatus according to the fifth embodiment are used in order to constitute an information processing system, learning can be performed individually in each information processing apparatus, thereby executing parallel processing. Therefore, even if the network is expanded, the processing time required for learning is substantially equal to that of a single information processing apparatus.

(Sixth Embodiment)

Below, an information processing apparatus according to a sixth embodiment of the present invention will be described with reference to the drawings.

A description will be given first to the overall structure of the information processing apparatus according to the present invention.

Figure 18:
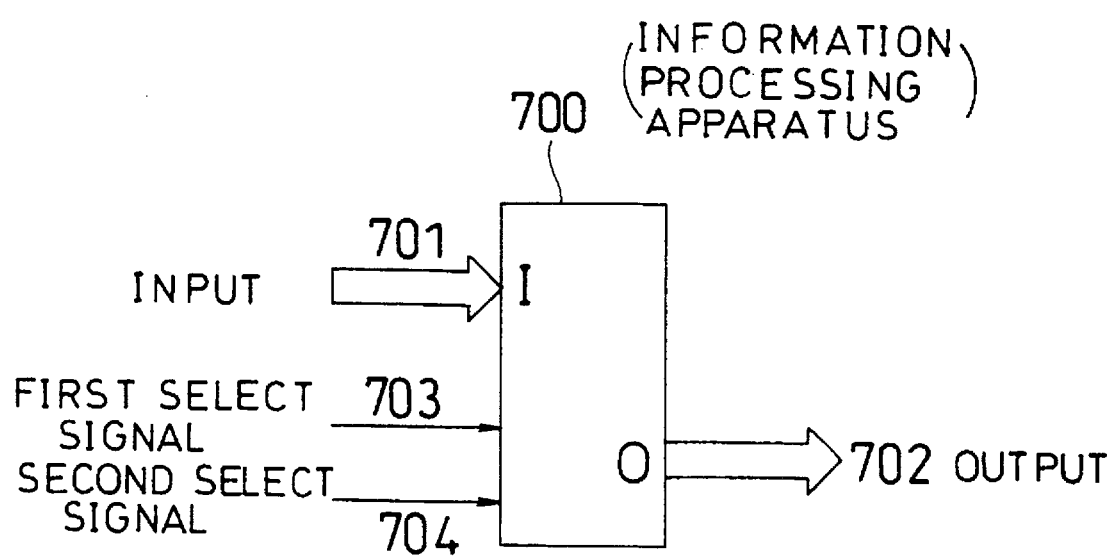
FIG. 18 is a view showing the overall structure of an information processing apparatus according to a sixth embodiment of the present invention.

FIG. 18 is a view showing the overall structure of the information processing apparatus according to the present embodiment. In the drawing, a reference numeral 700 designates the information processing apparatus for implementing a neural network composed of, e.g., a multi-layer neural network model, 701 designates characteristic data to be inputted to the information processing apparatus 700, 702 designates the processing result outputted from the information processing apparatus 700, 703 designates a first select signal for controlling the inputting and outputting of data to and from the information processing apparatus 700, and 704 designates a second select signal for controlling the inputting and outputting of data to and from the information processing apparatus 700, which is different from the first select signal 703.

When input data is supplied to the information processing apparatus 700, the first select signal 703 is asserted so as to input the characteristic data 701 to the information processing apparatus 700. When the inputting is completed, the first select signal 703 is negated. In order to obtain the processing result with respect to the characteristic data 701, the second select signal 704 is asserted so that the processing result 702 is outputted from the information processing apparatus 700.

In implementing a neural network by hardware, the largest problem is the network scale due to physical constraints imposed on it. As an object to be processed by a neural network becomes more complicated, a larger-scale network is required accordingly. On the other hand, there are always limits to the scale of a network that can be implemented by hardware. To circumvent the limits, it is common to expand the network by juxtaposing a plurality of identical information processing apparatus and perform parallel processing, so that increased efficiency can be obtained.

In the case of juxtaposing a plurality of information processing apparatus 700 according to the present embodiment for use, if two types of select signals are used in controlling the inputting and outputting of data so that the first select signal is shared by all the information apparatus and the second signal is inherent to each information processing apparatus, not only an expanded network can easily be implemented but also the loading of input data on the individual processing apparatus can be accomplished simultaneously, thereby increasing processing efficiency.

Next, a description will be given to the internal structure of the information processing apparatus 700.

Figure 19:
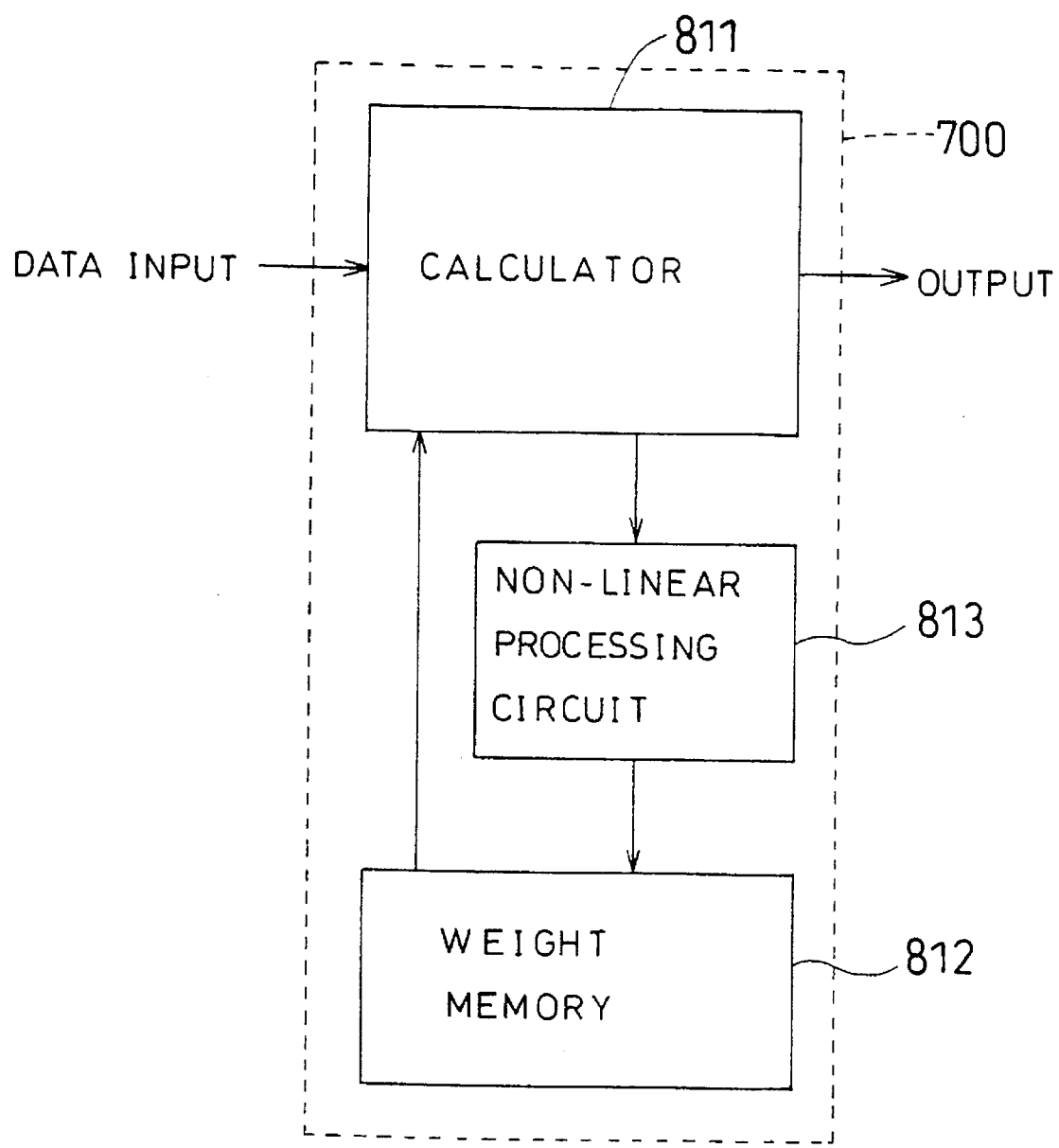
FIG. 19 is a block diagram showing an example of the internal structure of the information processing apparatus according to the sixth embodiment.

FIG. 19 is a block diagram showing an example of the internal structure of the information processing apparatus 700. As can be seen from the drawing, the information processing apparatus 700 comprises a calculating unit 811 for processing neurons, a weight memory 812 for holding the weight coefficient of a synapse, and a non-linear processing circuit 813 for converting data written in the weight memory 812 by the calculating unit 811.

In the information processing apparatus 700, data for recognition or learning is given to its data input and the result is obtained from its output.

In a recognizing operation in the information processing apparatus 700, data to be recognized is given to the data input, data corresponding to the weight coefficient of each synapse of a neuron is read out of the weight memory 812, and the processing of the neuron is performed by the calculating unit 811.

In a learning operation in the information processing apparatus 700, i.e., in the operation of changing the weight coefficient of a synapse, data to be learned is given to the data input, the data corresponding to the weight coefficient of each synapse of a neuron is read out of the weight memory 812, and the weight coefficient of a synapse of the learning neuron is calculated by the calculating unit 811, in accordance with the Hebb learning rule represented by the following equation (3).

$$W(t+1) = a * X + W(t) \tag{3}$$

wherein X represents an input signal to a synapse of a neuron, W represents the weight coefficient of the synapse, t represents time, and a represents a proper coefficient.

The weight coefficient of a synapse obtained through the calculation is subjected to non-linear processing by the non-linear processing circuit 813 and the data in the weight memory 812 is updated. The non-linear processing circuit 813 performs such non-linear processing as shown in FIG. 23.

Figure 24:
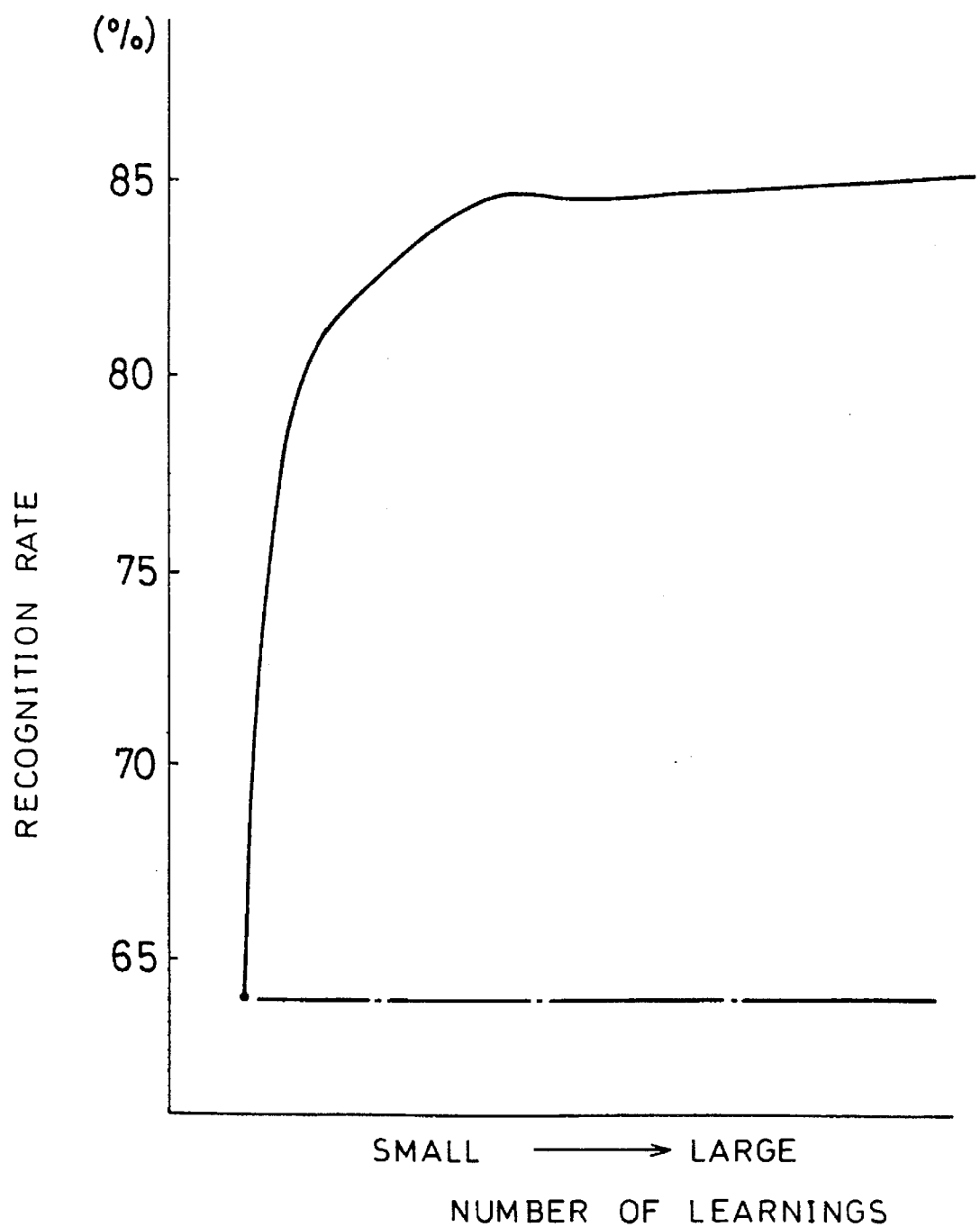
FIG. 24 is a view showing a difference in recognition rate between the information processing apparatus according to the sixth embodiment and a conventional information processing apparatus which does not perform non-linear processing.

FIG. 24 shows a difference in recognition rate between the information processing apparatus 700 according to the present embodiment and a conventional information processing apparatus which does not perform non-linear processing. In the drawing, the horizontal axis designates the number of learnings, the vertical axis designates a recognition rate with respect to unlearned data, the solid line designates a graph of the information processing apparatus 700, and the dash-dot line designates a graph of the conventional information processing apparatus. The drawing shows a variation in recognition rate in the case where printed characters were used as data. Specifically, 23 types of character sets consisting of 62 alphanumerics were prepared so that 13 types out of the above 23 types of character sets were used for learning, while alphanumerics of the remaining 10 types of character sets were used as unlearned data on a recognition test.

As shown in FIG. 24, in the conventional information processing apparatus which does not perform non-linear processing, the recognition rate with respect to unlearned data does not change even when the number of learnings is increased. In the information processing apparatus 700 which performs non-linear processing, by contrast, the recognition rate with respect to unlearned data can be increased by increasing the number of learnings, since the weight coefficient of a synapse is prevented from abruptly increasing at the time of learning and the influence of the weight coefficient of another synapse increases accordingly.

Figure 23:
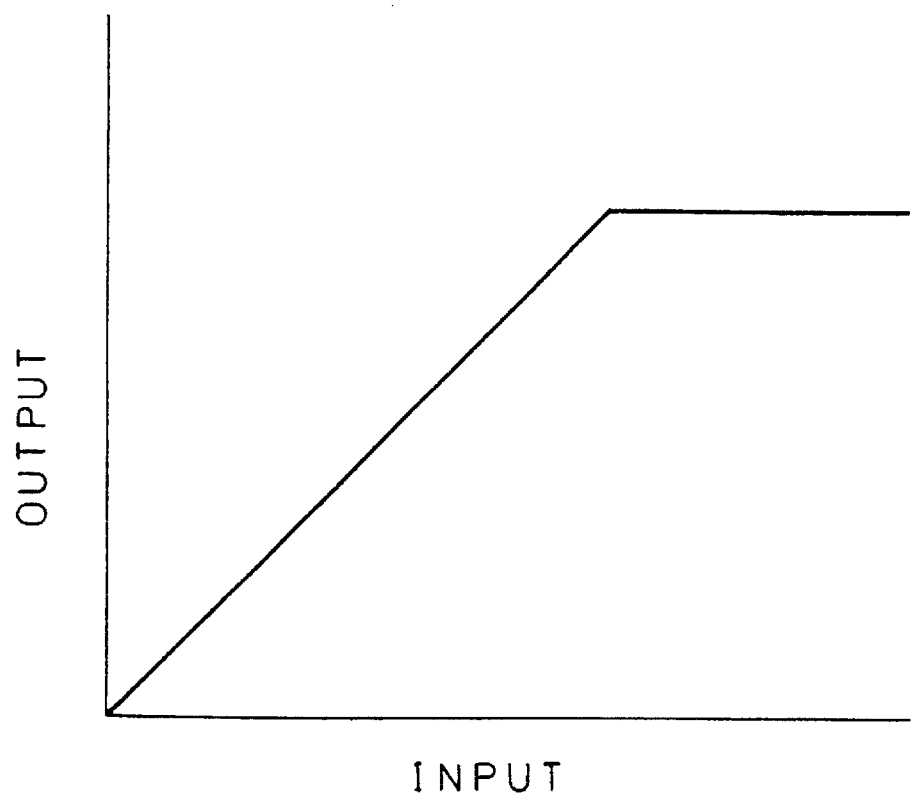
FIG. 23 is a view showing the operation of a non-linear processing circuit in the information processing apparatus according to the sixth embodiment.

Although the present embodiment has used the function shown in FIG. 23 as the non-linear processing, it is not limited thereto. The present embodiment has also used the Hebb learning rule in calculating the weight coefficient of a synapse of a learning output neuron, but it is not limited thereto, either.

(Seventh Embodiment)

Below, an information processing apparatus according to a seventh embodiment of the present invention will be described with reference to the drawings. The information processing apparatus according to the present embodiment was obtained by providing the information processing apparatus according to the sixth embodiment with another internal structure.

Figure 20:
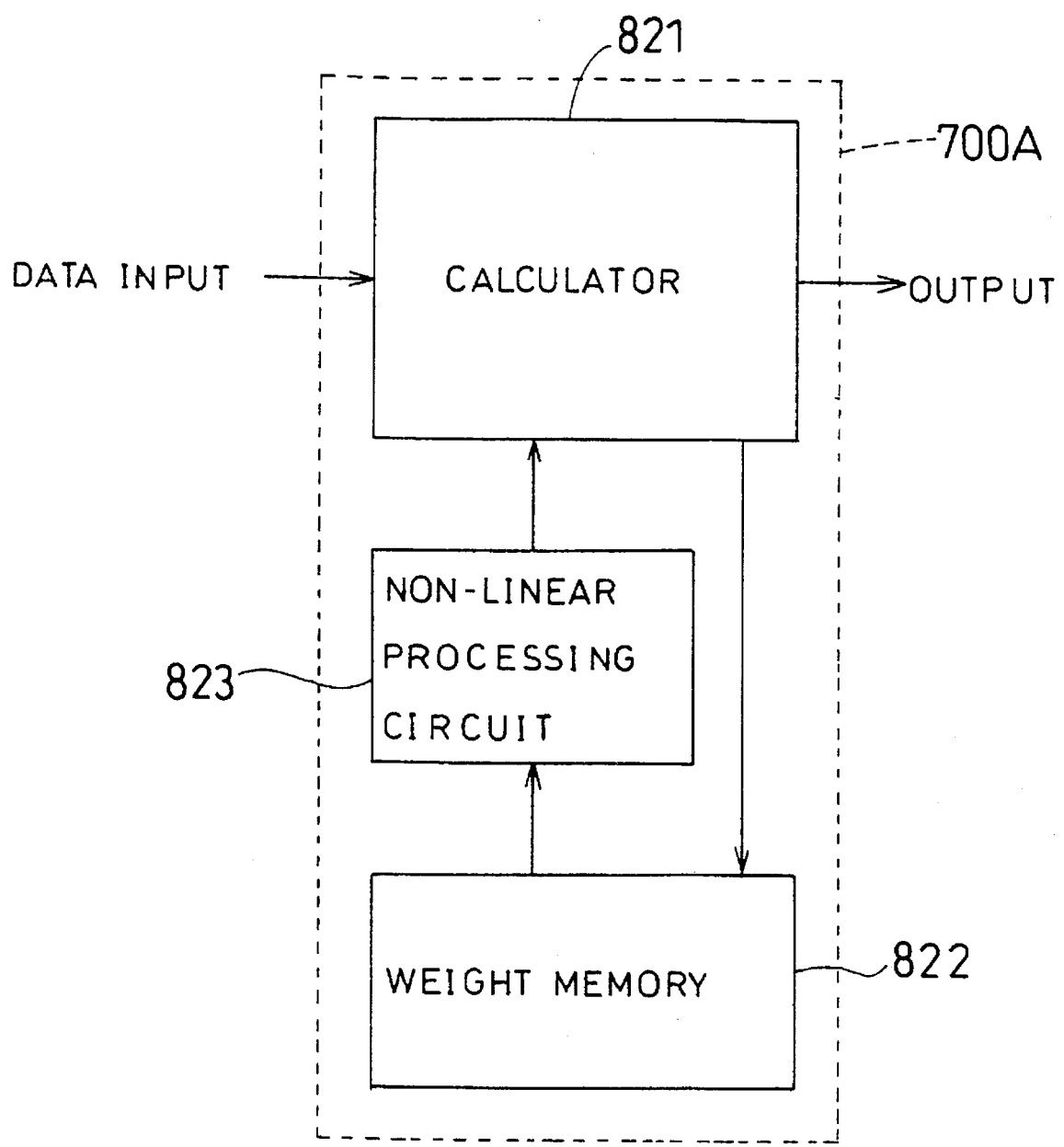
FIG. 20 is a block diagram showing the internal structure of an information processing apparatus according to a seventh embodiment of the present invention.

FIG. 20 is a block diagram showing the internal structure of the information processing apparatus 700A according to the present embodiment. As can be seen from the drawing, the information processing apparatus 700A comprises: a calculating unit 821 for processing a neuron; a weight memory 822 for holding the weight coefficient of a synapse; and a non-linear processing circuit 823 for converting data read from the weight memory 822 to the calculating unit 821.

In the information processing apparatus 700A, data for recognition or learning is given to its data input and the result of processing is obtained from its output.

In a recognizing operation in the information processing apparatus 700A, data to be recognized is given to the data input, data corresponding to the weight coefficient of each synapse of a neuron is read out of the weight memory 822 and then subjected to non-linear processing by the non-linear processing circuit 823, and the processing of the neuron is executed by the calculating unit 821. Thus, by performing non-linear processing with respect to the weight coefficient of a synapse to be used in the processing of the neuron, an influence which might be given by the weight coefficient of a synapse having a large value can be suppressed.

In a learning operation in the information processing apparatus 700A, data to be learned is given to the data input, the data corresponding to the weight coefficient of each synapse of a neuron is read out of the weight storage unit 822 and then subjected to non-linear processing by the non-linear processing circuit 823, the weight coefficient of a synapse of a learning output neuron is calculated by the calculating unit 821 in accordance with the Hebb learning rule represented by the equation (3), and the data in the weight memory 822 is updated. Thus, by performing non-linear processing with respect to the weight coefficient of a synapse prior to the calculation, the weight coefficient of a synapse to be updated can be prevented from becoming excessively large.

(Eighth Embodiment)

Below, an information processing apparatus according to an eight embodiment of the present invention will be described with reference to the drawings. The information processing apparatus according to the present embodiment was obtained by providing the information processing apparatus according to the sixth embodiment with another internal structure.

Figure 21:
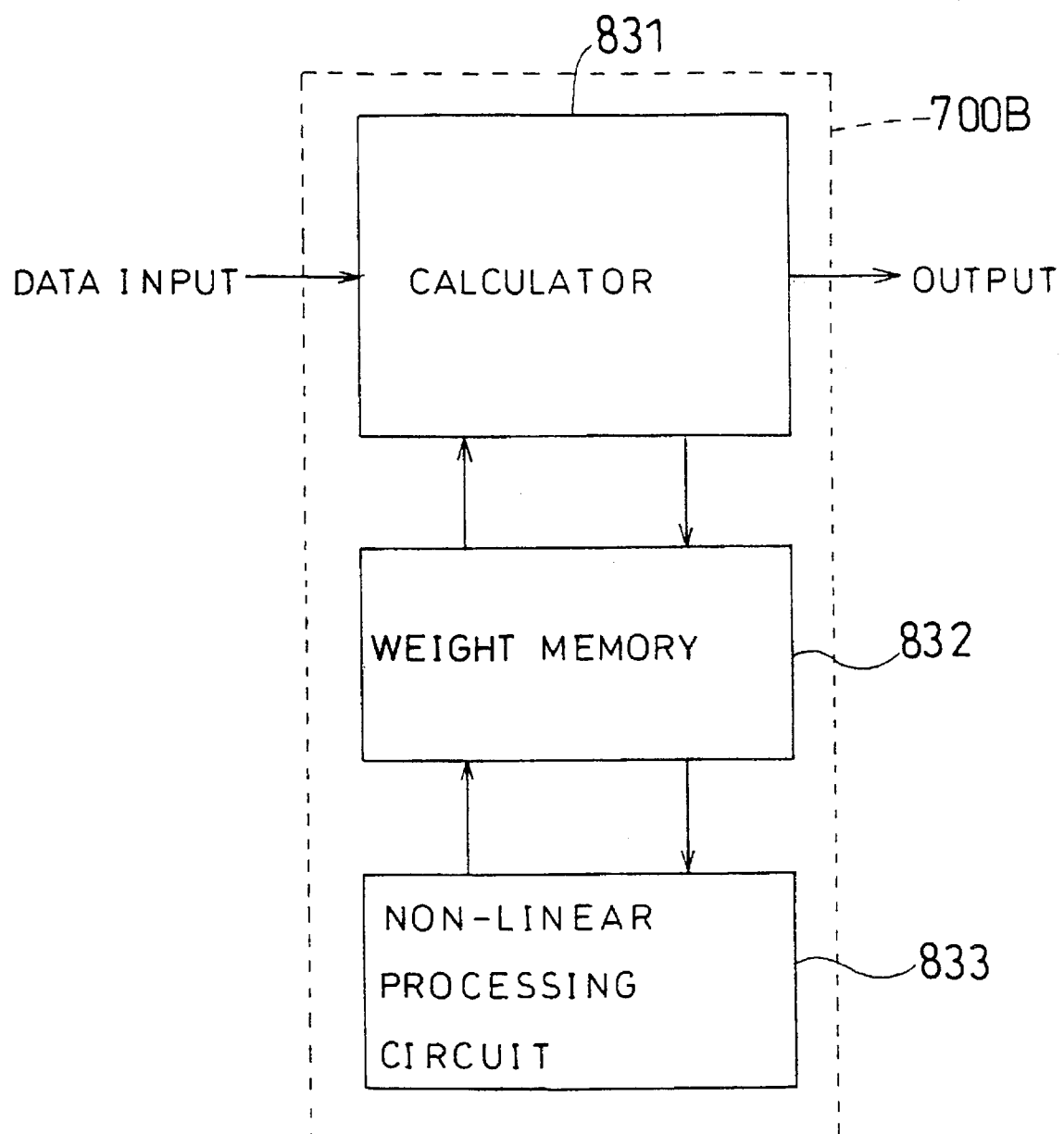
FIG. 21 is a block diagram showing the internal structure of an information processing apparatus according to an eighth embodiment of the present invention.

FIG. 21 is a block diagram showing the internal structure of the information processing apparatus 700B according to the present embodiment. As can be seen from the drawing, the information processing apparatus 700B comprises; a calculating unit 831 for processing a neuron; a weight memory 832 for holding the weight coefficient of a synapse;

and a non-linear processing circuit 833 for converting the updated data in the weight memory 832.

In the information processing apparatus 700B, data for recognition or learning is given to its data input and the processing result is obtained from its output.

In a recognizing operation in the information processing apparatus 700B, data to be recognized is given to the data input, data corresponding to the weight coefficient of each synapse of a neuron is read out of the weight memory 832, and the processing of a neuron is executed by the calculating unit 831.

In a learning operation in the information processing apparatus 700B, i.e., in the operation of changing the weight coefficient of a synapse, data to be learned is given to the data input, the data corresponding to the weight coefficient of each synapse of a neuron is read out of the weight memory 832, the weight coefficient of a synapse of a learning output neuron is calculated by the calculating unit 831 in accordance with the Hebb learning rule represented by the equation (3), and the data in the weight memory 832 is updated.

Figure 27:
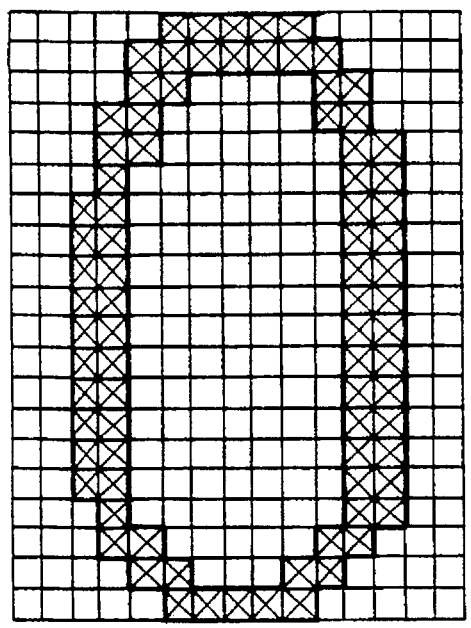
FIG. 27 is a view showing the pixels in the above character data.

A description will be given to a specific example of the learning operation in the information processing apparatus 700B according to the present embodiment. Here, it is assumed that numbers 0 to 9 of type 0 and number 0 to 9 of type 1 shown in FIG. 26 will be learned in accordance with the Hebb learning rule. Each of the numbers of types 0, 1, and 2 shown in FIG. 27 is constituted by a large number of pixels, as shown in FIG. 27, and each pixel is represented by a multiple value.

Figure 25:
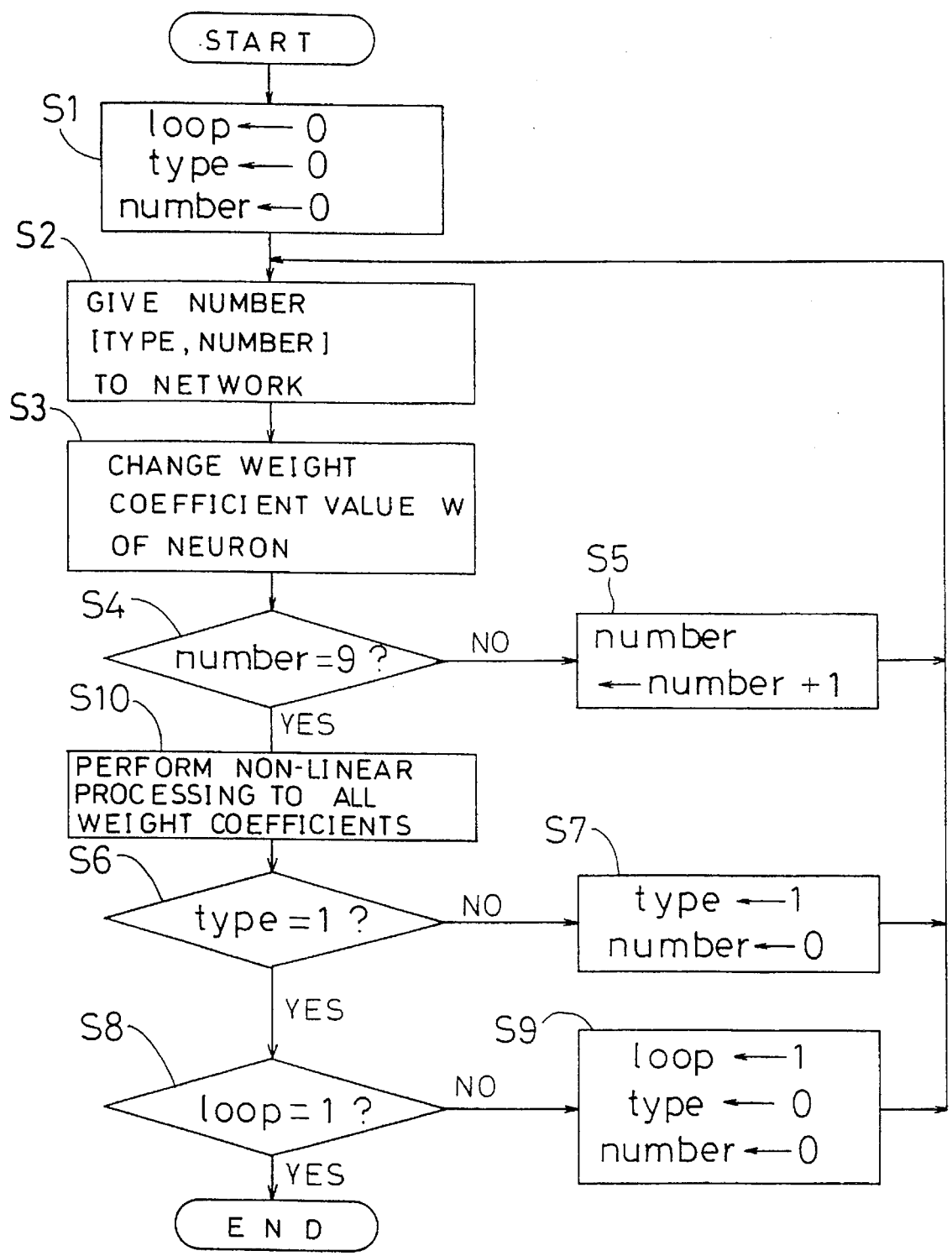
FIG. 25 is a flow chart showing a learning operation in the information processing apparatus according to the eighth embodiment.

FIG. 25 is a flow chart showing the flow of processing in accordance with the Hebb learning rule. As shown in FIG. 25, initialization is performed first in Step S1. In Step S2, all the values of the pixels related to the number 0 of type 0 are inputted to the information processing apparatus 700B. In Step S3, the value W of the weight coefficient of the synapse in question is changed through the calculation which was performed in accordance with the equation (3) by means of an input signal X given to a synapse of the neuron so that the neuron corresponding to the number 0 learns. In Step S4, thereafter, there is performed a judgment process of judging whether or not all the numbers from 0 to 9 of type 0 have been learned. Since only the number 0 has been learned, Step S4 is answered with NO, so that the number 1 of type 0 will be learned subsequently in Step S5, thereby returning to Step S2.

By repeating Steps S2 to S5 likewise, the numbers 1 to 9 of type 0 are sequentially learned. Every time a number is learned, the value W of the weight coefficient of a synapse of the neuron corresponding to the number is changed in accordance with the equation (3).

If the learning of the number 9 of type 0 is completed, Step S4 is answered with YES, so that processing goes on to Step S10, where the non-linear processing circuit 833 performs non-linear processing with respect to all the data stored in the weight memory 832. After that, processing goes on to Step S6.

In Step S6, there is performed a judgment process of judging whether or not all the numbers from 0 to 9 of type 1 have been learned. Since only the numbers 0 to 9 of type 0 have been learned, Step S6 is answered with NO, thereby going on to Step S7, where the number 0 of type 1 is learned subsequently. By repeating Steps S2 to S5 similarly to the case of type 0, the numbers 0 to 9 of type 1 are sequentially learned. After learning was completed, the non-linear processing circuit 833 performs non-linear processing with respect to all the data stored in the weight memory 832 in Step S10.

Thus, when the learning of the numbers 0 to 9 of types 0 and 1 and non-linear processing was executed, each of Steps S4 and S6 is answered with YES, thereby completing the first-time learning.

Next, in Step S8, there is performed a judgment process of judging whether or not the numbers of types 0 and 1 have been learned twice. Since they have been learned only once, Step S8 is answered with NO, thereby going on to Step S9, where initialization is performed for the second-time learning. After that, processing returns to Step S2 and the second-time learning is executed, similarly to the first-time learning.

Thus, learning is performed so that a desired neuron is fired, i.e., reaches the maximum value when the number used for learning is inputted as data for recognition.

A recognition rate obtained in the case where the numbers 0 to 9 of type 2, which have not yet been learned, are inputted as data for recognition is defined as an unlearned recognition rate. A higher unlearned recognition rate indicates higher learning efficiency.

Thus, with the information processing apparatus according to the present embodiment, it is possible to reduce the weight coefficient of a synapse which has been updated and has become excessively large. Consequently, the recognition rate with respect to unlearned data can be increased even in the case of handling data with little variance, such as printed characters, similarly to the information processing apparatus 700 according to the sixth embodiment.

(Ninth Embodiment)

Below an information processing apparatus according to a ninth embodiment of the present invention will be described with reference to the drawings. The information processing apparatus according to the present embodiment was obtained by providing the information processing apparatus according to the sixth embodiment with another internal structure.

Figure 22:
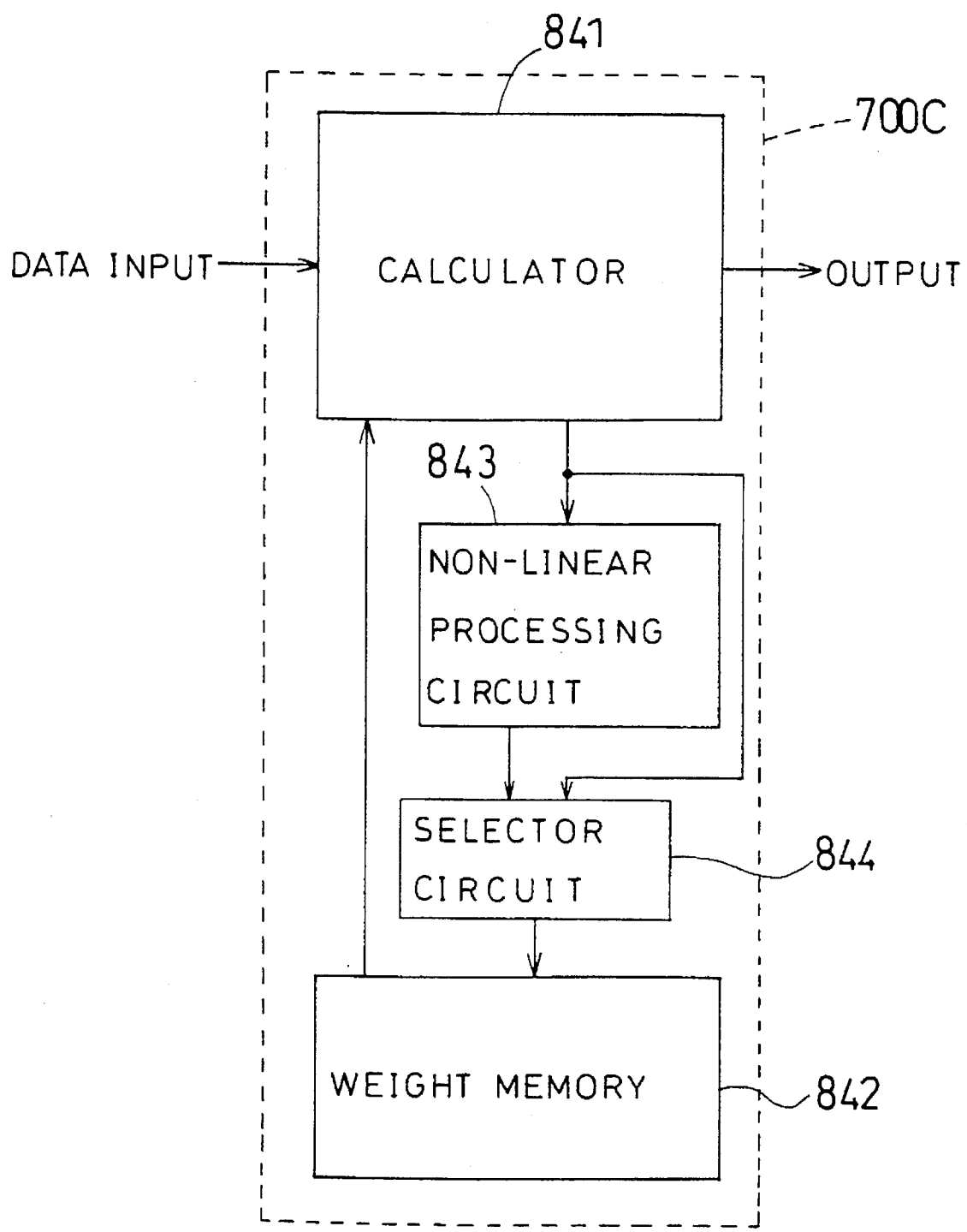
FIG. 22 is a block diagram showing the internal structure of an information processing apparatus according to a ninth embodiment of the present invention.

FIG. 22 is a block diagram showing the structure of the information processing apparatus 700C according to the present embodiment. As can be seen from the drawing, the information processing apparatus 700C comprises: a calculating unit 841 for performing the processing of a neuron; a weight memory 842 for holding the weight coefficient of a synapse; a non-linear processing circuit 843 for converting data written by the calculating unit 841 in the weight memory 842; and a selecting circuit 844 for selecting the data written in the weight memory 842.

In the information processing apparatus 700C, data for recognition or learning is given to its data input and the result of processing is outputted from its output.

If the selecting circuit 844 selects a signal from the non-linear processing circuit 843, the information processing apparatus operates in exactly the same manner as the information processing apparatus 700 according to the sixth embodiment, so that learning which increases the recognition rate with respect to unlearned data can be achieved in the case of handling very similar data sets with little variance, such as printed characters.

If the selecting circuit 844 selects a signal from the calculating unit 841, on the other hand, the information processing apparatus 700C can operate properly in the case of handling data sets with much variance, such as handwritten characters.

(Tenth Embodiment)

Below, an information processing apparatus according to a tenth embodiment of the present embodiment will be described with reference to the drawings.

Figure 28:
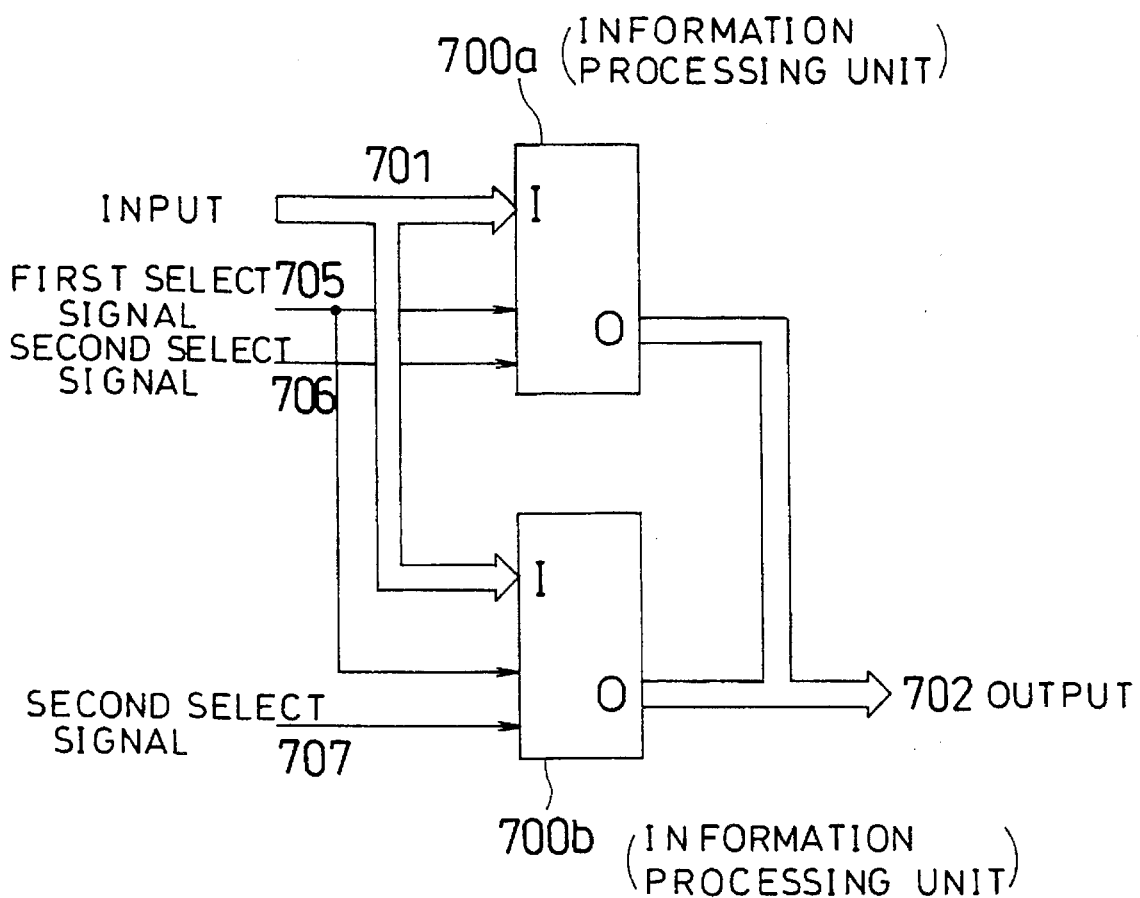
FIG. 28 is a view showing an information processing apparatus according to a tenth embodiment of the present invention.

FIG. 28 is a view showing the information processing apparatus according to the present embodiment. Here, a description will be given to the case where a neural network implemented by the information processing apparatus according to the sixth embodiment is expanded so that the number of its outputs is doubled.

In FIG. 28, reference numerals 700a and 700b designate information processing units which are identical with the information processing apparatus according to the sixth embodiment, a reference numeral 702 designates the output from the information processing units 700a and 700b, 705 designates a first select signal which are shared by the information processing units 700a and 700b, 706 designates a second select signal for the information processing unit 700a, and 707 designates a second select signal for the information processing unit 700b.

A description will be given first to the inputting of characteristic data to the information processing system. Both the information processing units 700a and 700b are selected by means of the first select signal 705 which is shared by the both information processing units, so that the characteristic data is simultaneously inputted to the information processing units 700a and 700b.

After the recognition process was completed, a recognition result 702 is outputted from the information processing unit 700a by means of the second select signal 706 for the information processing unit 700a. Subsequently, by means of the second select signal 707 for the information processing unit 700b, the recognition result 702 is outputted from the information processing unit 700b. These two values are compared with each other so as to obtain an answer as the recognition result for the whole network.

If the result is wrong, learning is performed in accordance with the Hebb learning rule only with respect to the information processing unit having a neuron of the output number to be fired, while learning is not performed with respect to the other information processing unit. With this system, the number of outputs of the neural network implemented by the information processing apparatus according to the sixth embodiment can be doubled.

Although there has been described the case where the number of outputs is doubled so far, the present embodiment can easily be applied to the case where the number of outputs is increased by k times by using k information processing units identical with the information processing apparatus according to the sixth embodiment. The present embodiment is also applicable to the case where the steepest descent is used in addition to the Hebb learning rule at the time of learning.

(Eleventh Embodiment)

Below, an information processing apparatus according to an eleventh embodiment of the present invention will be described with reference to the drawings.

Figure 29:
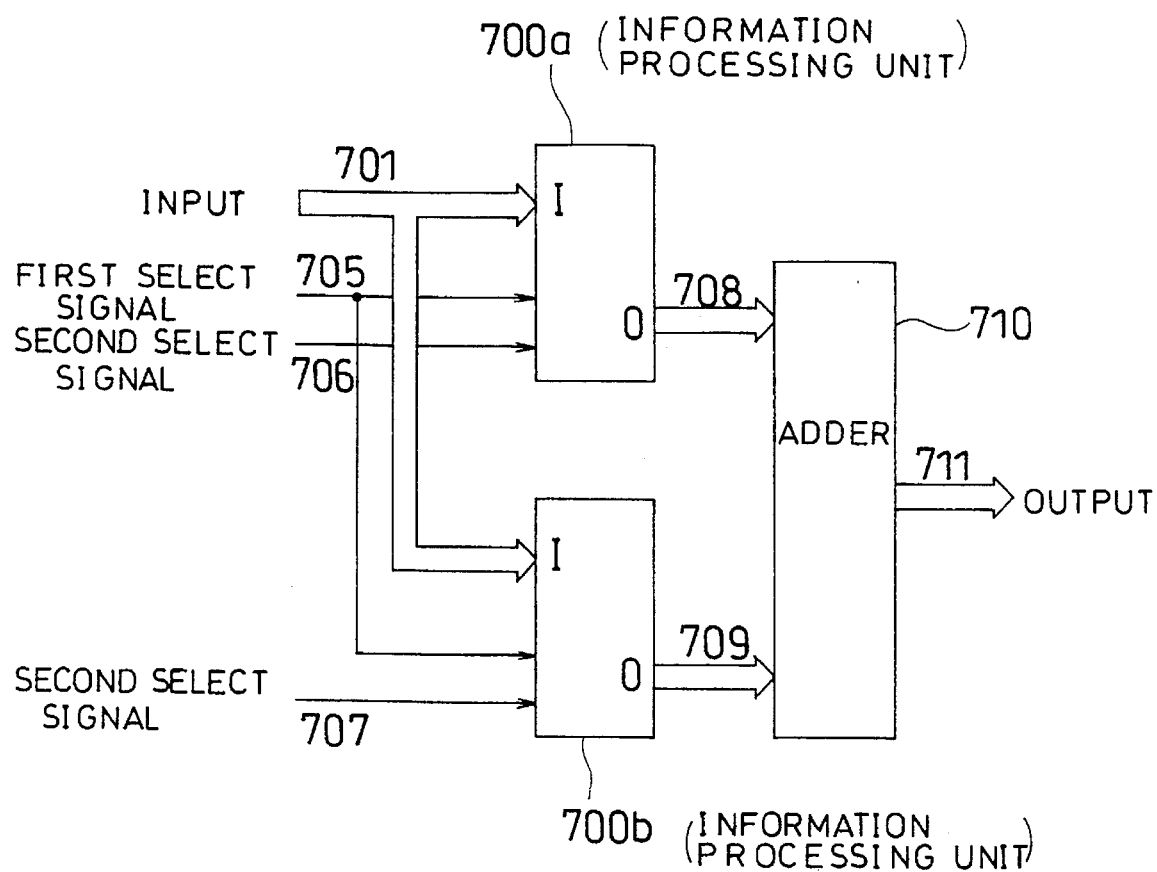
FIG. 29 is a view showing an information processing apparatus according to an eleventh embodiment of the present invention.

FIG. 29 is a view showing the information processing apparatus according to the present embodiment. Here, a description will be given to the case where an N-input M-output neural network is expanded so as to provide a 2N-input M-output neural network.

In FIG. 29, reference numerals 700a and 700b designate information processing units which are identical with the information processing apparatus according to the sixth embodiment, a reference numeral 705 designates a first select signal for the information processing units 700a and 700b, 706 designates a second select signal for the information processing unit 700a, 707 designates a second select signal for the information processing unit 700b, 708 designates the output of the information processing unit 700a, 709 designates the output of the information processing unit 700b, 710 designates an adder which receives the output 708 of the information processing unit 700a and the output 709 of the information processing unit 700b so as to add up these values, and 711 designates the output of the adder 710.

A description will be given first to the inputting of characteristic data to the information processing system. The information processing unit 700a is selected by means of the second select signal 706 for the information processing unit 700a, so that a half of 2N sets of input data are inputted to the information processing unit 700a. Subsequently, the information processing unit 700b is selected by means of the second select signal 707 for the information processing unit 700b, so that the remaining half of the 2N sets of data are supplied to the information processing unit 700b.

Next, the same number is assigned to the corresponding output neurons in the information processing unit 700a and information processing 700b. After the recognition process was executed, the adder 710 adds up the values of the output neurons of the same number in the information processing units 700a and 700b, so as to provide the number of the output neuron having the largest value as the recognition result. If the result is wrong, learning is performed in accordance with the Hebb learning rule with respect to the neurons of the same output number to be fired in the information processing units 700a and 700b. With this system, the number of inputs can be increased to 2N.

Although there has been described the case where the number of inputs is doubled so far, the present embodiment can easily be applied to the case where the number of inputs is increased by k times by using k information processing units identical with the information processing apparatus according to the sixth embodiment. The present embodiment is also applicable to the case where the steepest descent is used in addition to the Hebb learning rule at the time of learning.

(Twelfth Embodiment)

Below, an information processing apparatus according to a twelfth embodiment of the present invention will be described with reference to the drawings.

Figure 30:
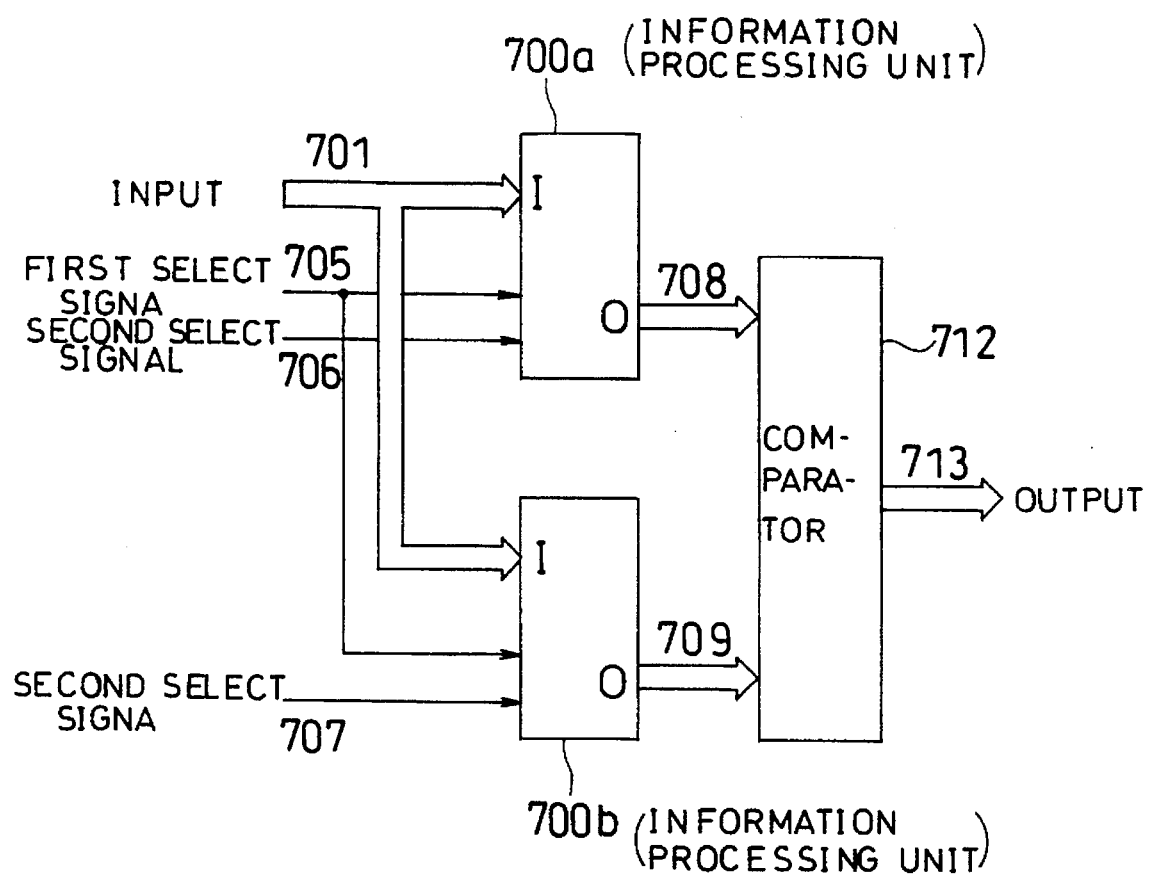
FIG. 30 is a view showing an information processing apparatus according to a twelfth embodiment of the present invention.

FIG. 30 is a view showing the information processing apparatus according to the present embodiment. Here, a description will be given to the case where an N-input M-output neural network is expanded so as to provide an N-input 2M-output neural network.

In FIG. 30, reference numerals 700a and 700b designate information processing units which are identical with the information processing apparatus according to the sixth embodiment. A reference numeral 705 designates a first select signal for the information processing units 700a and 700b, 706 designates a second signal for the information processing unit 700a, 707 designates a second signal for the information processing unit 700b, 708 designates the output of the information processing unit 700a, 709 designates the output of the information processing unit 700b, 710 designates a comparator for receiving the output 708 of the information processing unit 700a and the output 709 of the information processing unit 700*b* so as to compare them, and 713 designates the output of the comparator 712.

A description will be given first to the inputting of characteristic data to the neural network. Each of the information processing units 700*a* and 700*b* is selected by means of the first select signal 705 which is shared by the both information processing units, so that the characteristic data is inputted simultaneously to the information processing units 700*a* and 700*b*.

Next, after the recognition process was executed, the number of the output neuron having the largest value of all the output neurons in the information processing unit 700*a* is set as the output 708 of the information processing unit 700*a*, while the number of the output neuron having the largest value of all the output neurons in the information processing unit 700*b* is set as the output 709 of the information processing unit 700*b*, so that the values of these output neurons are inputted to the comparator 712. Then, the number of the output neuron having the larger value of these two output neurons is outputted as the result 713 of the recognition process.

If the result is wrong, learning is performed in accordance with the Hebb learning rule only with respect to that one of information processing units 700*a* and 700*b* which has the output neuron of the output number to be fired, while the learning is not performed with respect to the other information processing unit. With this system, the number of outputs can be increased to 2M.

Although there has been described the case where the number of outputs is doubled so far, the present embodiment can easily be applied to the case where the number of outputs is increased by k times by using k information processing units identical with the information processing unit according to the sixth embodiment. The present embodiment is also applicable to the case where the steepest descent method is used in addition to the Hebb learning rule at the time of learning.

We claim:

1. An information processing apparatus for implementing a multi-layer neural network having a plurality of neurons, each of which recognizes or learns an input signal through a calculation in the network, said apparatus comprising:

a first storage means for storing network interconnection information which indicates the information which indicates the interconnection of said plurality of neurons in said neural network by showing the process in which said plurality of neurons were generated by proliferation so that the network interconnection information can be rewritten;

a second storage means for storing neuron internal information which is specific information on individual neurons in said neural network so that the neuron internal information can be rewritten;

a third storage means for storing a neuron read out of said first storage means;

a fourth storage means for storing the neuron internal information read out of said second storage means; and a calculating means for retrieving the neuron which responds to said input signal by using the network interconnection information stored in said first storage means, reading out of said first storage means the retrieved neuron so that it is written in said third storage means, reading out of said second storage means the neuron internal information corresponding to the neuron stored in said third storage means so that it is written in said fourth storage means, and performing said calculation in the network by using the neuron internal information stored in said fourth storage means.

2. An information processing apparatus according to claim 1, wherein said calculating means further has a function of rewriting the neuron internal information stored in said second storage means and rewriting the network interconnection information stored in said first storage means by using the neuron-internal information which has been rewritten.

3. An information processing apparatus for implementing a multi-layer neural network having a plurality of neurons, each of which has state energy and proliferates if said state energy exceeds a specified threshold value, so as to perform learning by changing the state energy of any neuron of said plurality of neurons and a connection load of a synapse connected to said neuron, said apparatus comprising:

a number assigning means for assigning a specific neuron number to each of said plurality of neurons;

a first storage means for storing network interconnection information which indicates the interconnection of said plurality of neurons, each having said neuron number, by showing the process in which said plurality of neurons were generated by proliferation so that the network interconnection information can be rewritten;

a second storage means for storing the state energy of each of said plurality of neurons and the connection load of a synapse connected to each of said plurality of neurons so that each of the state energy and connection load can be rewritten;

a first calculating means for retrieving a fired neuron by using the network interconnection information stored in said first storage means and reading the neuron number assigned to the retrieved neuron out of said first storage means;

a second calculating means for reading, by using the neuron number read out by said first calculating means, the state energy of the neuron corresponding to said neuron number and the connection load of a synapse connected to said neuron out of said second storage means; and a third calculating means for calculating, by using the connection load of a synapse read out by said second calculating means, the sum of products of the outputs of said plurality of neurons and the connection loads of synapses connected to said plurality of neurons.

4. An information processing apparatus according to claim 3, wherein said number assigning means assigns ascending node numbers to said plurality of neurons in the order in which the neurons were generated by proliferation.

5. An information processing apparatus according to claim 3, wherein said second calculating means further has a function of rewriting the state energy and the connection load of a synapse stored in said second storage means and said first calculating means further has a function of rewriting, by using the state energy which has been rewritten by said second calculating means, the network interconnection information stored in said first storage means.

6. An information processing apparatus for implementing a multi-layer neural network having a plurality of neurons, each of which has state energy and proliferates if said state energy exceeds a specified threshold value, so as to perform learning by changing the state energy of any neuron of said plurality of neurons and a connection load of a synapse connected to said neuron, said apparatus comprising:

number assigning means for assigning a specific neuron number to each of said plurality of neurons;

storage means for storing network interconnection information which indicates the interconnection of said plurality of neurons, each having said neuron number, by showing the process in which said plurality of neurons were generated by proliferation, the state energy of each of said plurality of neurons, and the connection load of a synapse connected to each of said plurality of neurons so that each of the network interconnection information, state energy, and connection load of a synapse can be rewritten;

a first calculating means for retrieving a fired neuron by using the network interconnection information stored in said storage means and reading the neuron number assigned to the retrieved neuron out of said storage means;

a second calculating means for reading, by using the neuron number read out by said first calculating means, the state energy of the neuron corresponding to said neuron number and the connection load of a synapse connected to said neuron out of said storage means;

a third calculating means for calculating, by using the connection load of a synapse read out by said second calculating means, the sum of products of the outputs of said plurality of neurons and the connection loads of synapses connected to said plurality of neurons;

an address converting means for inverting the logic of each bit at a first address outputted from said first calculating means so as to provide a second address and outputting the resulting second address;

a selecting means for selecting either of the second address outputted from said address converting means and a third address outputted from said second calculating means and, if said second address was selected, enabling said first calculating means to access the second address in said storage means while, if said third address was selected, enabling said second calculating means to access the third address in said storage means; and a select signal output means for outputting a select signal for determining the selection by said selecting means.

7. An information processing apparatus according to claim 6, wherein said second calculating means further has a function of rewriting the state energy and the connection load of a synapse stored in said storage means and said first calculating means further has a function of rewriting, by using the state energy which has been rewritten by said second calculating means, the network interconnection information stored in said storage means.

8. An information processing apparatus for implementing a neural network which selects, as candidates for a recognition result, n categories out of N categories which are obtained by subjecting an input signal to a calculation in the network so as to be recognized, said apparatus comprising:

first to (n−1)-th candidate selecting means, each having a comparing means for comparing the values of two sets of data, a first storage means for storing, of said two sets of data, that set of data having a larger value, a second storage means for storing, of said two sets of data, that set of data having a smaller value, a third storage means for storing information for distinguishing the data stored in said first storage unit from other accompanying data, and a fourth storage means for storing information for distinguishing the data stored in said second storage means from other accompanying data;

an n-th candidate selecting means having said comparing means and said first and third storage means, the first to n-th candidate selecting means being connected in cascade so that either of the two sets of data compared by the comparing means of said candidate selecting means is stored in the first storage means of the first candidate selecting means, while the other set of data becomes any of the N sets of data, and that either of the two sets of data compared by the comparing means of an i-th ($2 \leq i \leq n$) candidate selecting means is stored in the first storage means of the i-th candidate selecting means, while the other set of data is stored in the second storage means of an (i−1)-th candidate selecting means.

9. An information processing apparatus for implementing a neural network having a plurality of neurons each of which performs learning upon receiving a teacher signal having first and second values, said apparatus comprising:

a specifying means for specifying, among said plurality of neurons, a neuron which performs learning by using the first value of said teacher signal; and a determining means for determining whether or not the specified neuron by said specifying means is valid, wherein, only if it is determined that the specified neuron is valid, learning is performed by the neuron specified by using the first value of said teacher signal and learning is performed by said plurality of neurons except for the specified neuron by using the second value of said teacher signal.

10. An information processing apparatus for implementing a multi-layer network which performs a recognition process with respect to given characteristic data through a calculation in the network and outputs a processing result, said apparatus comprising:

a first signal for executing an input of said characteristic data from the environment or an output of said processing result to the environment; and a second signal, different from said first signal, for executing the input of said characteristic data from the environment or the output of said processing result to the environment.

11. An information processing apparatus for implementing a multi-layer neural network, said apparatus comprising a plurality of information processing units each of which performs a recognition process with respect to given characteristic data through a calculation in the network and outputs the processing result, each of said plurality of information processing units having:

a first signal for executing an input of the characteristic data from the environment of said information processing unit or an output of the processing result to the outside of said information processing unit, said first signal being shared by all the information processing units; and a second signal for executing the input of the characteristic data from the environment of said information processing unit or the outputting of the processing result to the outside of said information processing unit, said second signal being inherent to said information processing unit.

12. An information processing apparatus for implementing a multi-layer neural network, said apparatus comprising:

a plurality of information processing units each of which performs a recognition process with respect to given characteristic data through a calculation in the network and outputs the processing result; and an adding means for adding up the processing results outputted from said plurality of information processing units, each of said information processing units having:

a first signal for executing an input of the characteristic data from the environment of said information processing unit or an output of the processing result to said adding means, said first signal being shared by all the information processing units; and second signal for executing the input of the characteristic data from the environment of said information processing unit or output of the processing result to said adding means, said second signal being inherent to said information processing unit.

13. An information processing apparatus for implementing a multi-layer neural network, said apparatus comprising:

a plurality of information processing units each of which performs a recognition process with respect to given characteristic data through a calculation in the network and outputs the processing result; and a comparing means for comparing the processing results outputted from said plurality of information processing units, each of said information processing units having:

a first signal for executing an input of the characteristic data from the environment of said information processing unit or an output of the processing result to said comparing means, said first signal being shared by all the information processing units; and a second signal for executing the input of the characteristic data from the environment of said information processing unit or an output of the processing result to said comparing means, said second signal being inherent to said information processing unit.

14. An information processing apparatus for implementing a neural network consisting of neurons each having a synapse, said apparatus comprising:

a storage means for storing the weight coefficient of said synapse;

a calculating means for performing a calculation by using the weight coefficient of said synapse read out of said storage means and an input signal to said synapse and outputting the calculation result; and a non-linear processing means for performing non-linear processing with respect to said calculation result from said calculating means and writing, in said storage means, the non-linear processing result as a new weight coefficient of said synapse.

15. An information processing apparatus for implementing a neural network consisting of neurons each having a synapse, said information processing apparatus comprising:

a storage means for storing the weight coefficient of said synapse;

a non-linear processing means for performing non-linear processing with respect to the weight coefficient of said synapse read out of said storage means and outputting the non-linear processing result; and a calculating means for performing a calculation by using said non-linear processing result from said non-linear processing means and an input signal to said synapse so as to write, in said storage means, the calculation result as a new coefficient of said synapse.

16. An information processing apparatus for implementing a neural network consisting of neurons each having a synapse, said apparatus comprising:

a storage means for storing the weight coefficient of said synapse;

a non-linear processing means for performing non-linear processing with respect to the weight coefficient of said synapse read out of said storage means; and a calculating means for executing the processing of said neuron by using the non-linear processing result from said non-linear processing means and an input signal to said synapse so as to output the processing result.

17. An information processing apparatus for implementing a neural network consisting of neurons each having a synapse, said information processing apparatus comprising:

a storage means for storing the weight coefficient of said synapse;

a calculating means for performing a calculation by using the weight coefficient of said synapse read out of said storage means and an input to said synapse so as to write the calculation result in said storage means; and a non-linear processing means for performing non-linear processing with respect to said calculation result read out of said storage means so as to write, in said storage means, the non-linear processing result as a new weight coefficient of said synapse.

18. An information processing apparatus for implementing a neural network consisting of neurons each having a synapse, said apparatus comprising:

a storage means for storing the weight coefficient of said synapse;

a calculating means for performing a calculation by using the weight coefficient of said synapse read out of said storage means and an input to said synapse so as to output the calculation result;

a non-linear processing means for performing non-linear processing with respect to said calculation result from said storage means and outputting the non-linear processing result; and a selecting means for selecting either of said calculation result from said calculating means and said non-linear processing result from said non-linear processing means so that the selected result is written in said storage means as a new weight coefficient of said synapse.

* * * * *